(12) United States Patent
Pinho et al.

(10) Patent No.: US 10,169,359 B1
(45) Date of Patent: Jan. 1, 2019

(54) DISTRIBUTION CONTENT-AWARE COMPRESSION AND DECOMPRESSION OF DATA

(71) Applicant: EMC IP Holding Company LLC, Hopkinton, MA (US)

(72) Inventors: Rômulo Teixeira de Abreu Pinho, Niteroi (BR); Angelo E. M. Ciarlini, Rio de Janeiro (BR); Luiz Guilherme Oliveira dos Santos, Niteroi (BR); Edward José Pacheco Condori, Rio de Janeiro (BR); André de Almeida Maximo, Rio de Janeiro (BR); Alex Laier Bordignon, Niteroi (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 528 days.

(21) Appl. No.: 14/867,329

(22) Filed: Sep. 28, 2015

(51) Int. Cl.
    *G06F 17/30* (2006.01)
(52) U.S. Cl.
    CPC .. *G06F 17/30153* (2013.01); *G06F 17/30194* (2013.01); *G06F 17/30598* (2013.01)
(58) Field of Classification Search
    None
    See application file for complete search history.

(56) References Cited

U.S. PATENT DOCUMENTS

| 5,920,828 | A  | * | 7/1999  | Norris    | G01V 1/003    |
|           |    |   |         |           | 702/14        |
| 7,987,162 | B2 | * | 7/2011  | Aston     | G06F 17/30153 |
|           |    |   |         |           | 707/693       |
| 8,553,497 | B2 | * | 10/2013 | Krohn     | G01V 1/364    |
|           |    |   |         |           | 367/45        |
| 8,990,217 | B2 | * | 3/2015  | Jagmohan  | H03M 7/3084   |
|           |    |   |         |           | 367/14        |

(Continued)

OTHER PUBLICATIONS

Zhengbing Zhang et al. "Seismic data compression based on wavelet transform", Oct. 31, 2014, www.spiedigitallibrary.org/ conference-proceeding-of-spie (Year: 2014).*

(Continued)

*Primary Examiner* — Debbie M Le
(74) *Attorney, Agent, or Firm* — Ryan, Mason & Lewis, LLP

(57) ABSTRACT

Distributed content-aware compression and decompression techniques are provided for data, such as seismic data. Data is compressed by obtaining a file chunk of a plurality of file chunks of a larger file, a start offset of the file chunk, and a data descriptor indicating how the file chunk should be processed based on characteristics of the larger file. Headers in the file chunk are compressed using a substantially lossless header compression technique to obtain compressed headers. Samples in the file chunk are compressed using a substantially lossless sample compression technique to obtain compressed samples. The compressed headers and compressed samples are packed into a single bit stream (Continued)

comprising a compressed version of the file chunk. The compression can be performed in a physical or logical layer of storage nodes of a file system or in compute nodes of a computing cluster. The compression can be executed on demand by an external agent and/or in a background mode by a storage operating system.

30 Claims, 15 Drawing Sheets

(56) References Cited

U.S. PATENT DOCUMENTS

| | | | | |
|---|---|---|---|---|
| 9,660,666 | B1* | 5/2017 | Ciarlini | H03M 7/30 |
| 9,767,154 | B1* | 9/2017 | Wallace | G06F 17/30501 |
| 9,852,149 | B1* | 12/2017 | Taylor | G06F 17/30194 |
| 9,858,311 | B2* | 1/2018 | Bordignon | G06F 17/30371 |
| 9,954,550 | B1* | 4/2018 | Ciarlini | H03M 7/30 |
| 2003/0051005 | A1* | 3/2003 | Burch, Jr. | G06F 17/30011 |
| | | | | 709/219 |
| 2012/0089781 | A1* | 4/2012 | Ranade | G06F 17/30203 |
| | | | | 711/118 |
| 2014/0169133 | A1* | 6/2014 | Nemeth | G01V 1/28 |
| | | | | 367/43 |

OTHER PUBLICATIONS

Ciarlini et al., "Content-Aware Lossless Compression and Decompression of Floating Point Data", U.S. Appl. No. 14/579,130, filed Dec. 22, 2014.

Pinho et al., "Random Access to Compressed Data Using Bitwise Indices", U.S. Appl. No. 14/749,826, filed Jun. 25, 2015.

Bordignon et al., "Heterscedastic Data Compression Using Arima-Garch Model Estimation", U.S. Appl. No. 14/230,510, filed Mar. 31, 2014.

Mandyam et al., "Lossless Seismic Data Compression Using Adaptive Linear Prediction," Geoscience and Remote Sensing Symposium, 1996. IGARSS '96. 'Remote Sensing for a Sustainable Future.', International, vol. 2, No., pp. 1029,1031 vol. 2, May 27-31, 1996.

P. Elias, "Universal Codeword Sets and Representations of the Integers", IEEE Trans, on Information Theory. vol. 21, No. 2, pp. 194-203 (Mar. 1975).

D. Huffman, "A Method for the Construction of Minimum-Redundancy Codes", Proceedings of the IRE (1952).

Barker et al., "Storage Area Network Essentials: A Complete Guide to Understanding and Implementing SANs" John Wiley & Sons (2002).

Anjan Dave, "Understanding Enterprise NAS", Storage Networking Industry Association (2012).

A. S. Tanenbaum, "Modern Operating Systems", Prentice Hall, 2001.

"SEG-Y Standard", http://www.seg.org/resources/publications/misc/technical-standards.

Eggert et al., "Idletime scheduling with preemption intervals", ACM SIGOPS Operating Systems Review, vol. 39, No. 5, pp. 249-262, 2005.

Mi et al., "Efficient management of idleness in storage systems", ACM Transactions on Storage, vol. 5, No. 2, pp. 1-25, 2009.

Snia, "Storage Networking & Information Management Primer", http://www.snia.org/education/storage_networking_primer.

InfiniBandTM Architecture Specification, vol. 1, InfiniBandSM Trade Association http://www.infinibandta.org/content/pages.php?pg=about_us_infiniband 2015.

\* cited by examiner

| | SECTION | EXAMPLE |
|---|---|---|
| 610 | BASIC INFORMATION | NUMBER OF TRACES, SAMPLES PER TRACE, SAMPLE DATA TYPE |
| 620 | SAMPLE ANALYSIS | SAMPLE STATISTICS AND PARAMETERS FOR THE DATA COMPRESSION ALGORITHM |
| 630 | HEADER ANALYSIS | HEADER STATISTICS AND PARAMETERS FOR THE HEADER COMPRESSION ALGORITHM |

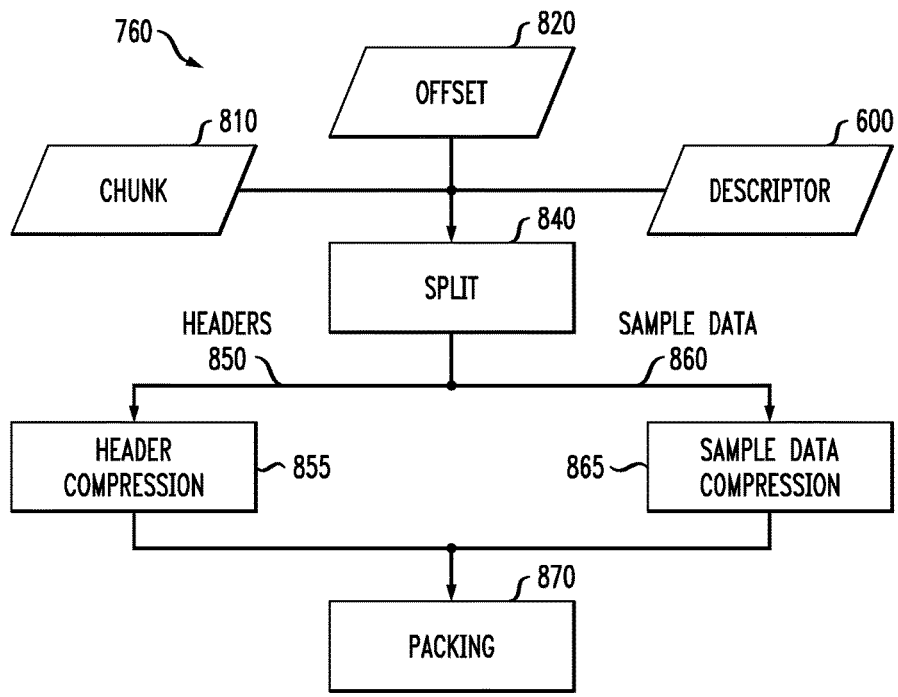
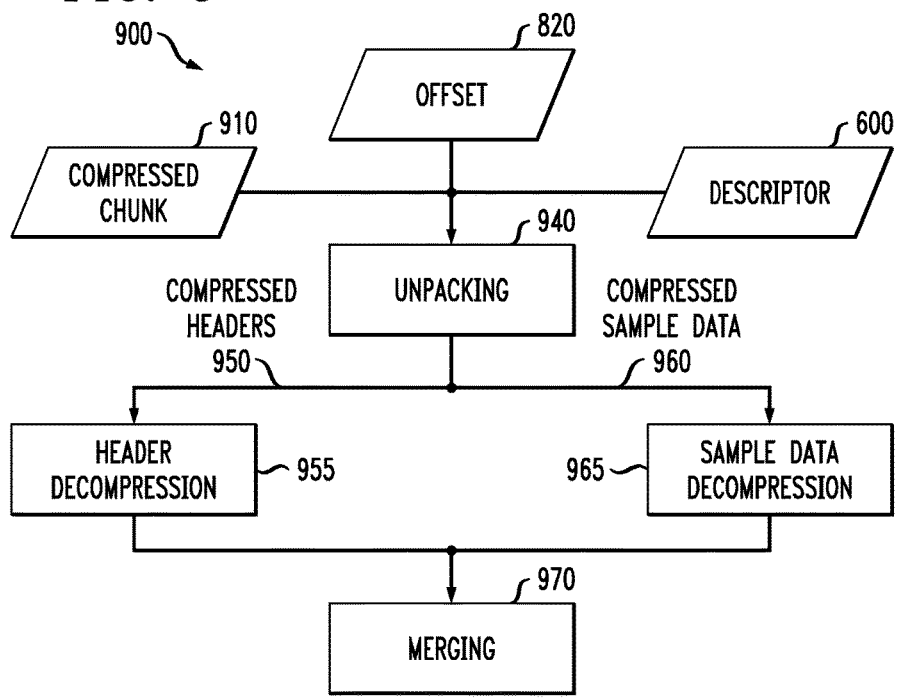

```
init_trace_header_compression(
        input: FILE_HANDLE, {handle to input file 705}
        descriptor: DESCR_HANDLE, {handle to partially created descriptor}
    )
    {read T trace headers from file and format them as a matrix}
    {each matrix line contains all field values of one trace header;
    each matrix column contains the T values read for one header field}
    header_field_matrix = read_headers(input, T)

for each column in header_field_matrix
              ⎧  {get column/field index}
              ⎪  j = column_index(column)
       1010 ⎨  {fit line through the T field values}
              ⎩  coefficients = fit_line(column)

1020 ⎰ {add line coefficients to descriptor}
              ⎱ add_data(descriptor, coefficients)
              {compute fitting error}
              total_error = apply_line(coefficients, column)
              {update global zero table according to fitting error}
              ⎧ if (total_error = 0)
              ⎪         set_bit(global_zero, j)
       1030 ⎨ else
              ⎪         reset_bit(global_zero, j)
              ⎩ end
    end {add zero field to descriptor}
    add_data(descriptor, global_zero)
end
```

```
chunk_trace_header_compression(
    offset: OFFSET_TYPE,
    size: SIZE_TYPE,
    chunk: DATA_HANDLE,
    descriptor: DATA_HANDLE
)
    {read trace headers from chunk and format them as a matrix}
    {each matrix line contains all field values of one trace header;
    each matrix column contains T values read for one header field}
    {use 'offset' to infer which header portions are present in chunk;
    assign zero to matrix cells corresponding to missing fields}
    header_field_matrix = read_headers(size, offset, chunk, descriptor)

for j = 1 to num_columns(header_field_matrix)
        {read line coefficients from the descriptor, for each header field}
        coefficients = read_line_coefficients(descriptor, j)
        for i = 1 to num_lines(header_field_matrix)
1110 ⎰ {infer trace index from offset}
     ⎱ trace_index = infer_index(offset, i)
1120 ⎰ {predict field value with line function}
     ⎱ prediction = coefficients.a * trace_index + coefficients.b
1130 ⎰ {compute error in prediction}
     ⎱ residual = header_field_matrix[i, j] - prediction
1140 ⎰ {store residual in list}
     ⎱ add(residual_list, residual)
        {update local zero table}
        ⎧ if (residual = 0)
        ⎪     set_bit(local_zero[i], j)
1150 ⎨ else
        ⎪     reset_bit(local_zero[i], j)
        ⎩ end
        end
    end
end
```

FIG. 11B

```
{retrieve global zero table from descriptor}
   global_zero = read_global_zero(descriptor)
   {for each trace header, compute which fields did not match the global zero
   prediction}
   for i = 1 to num_lines(header_field_matrix)
1160 ⎰ {store differences from local zero table to global zero table}
     ⎱ difference_zero[i] = local_zero[i] xor global_zero
         {from the difference zero table, retrieve the list of indices of fields that
1170 ⎰ did not match the global zero prediction}
     ⎱ local_differences[i] = get_indices_of_set_bits(difference_zero[i])
   end {for each trace header, compress differences between the local and global zero
   tables along with the residuals that differed from zero}
   {the two lists are just sequences of integral numbers and will be compressed with
   the same algorithm, as described in the text}
   for i = 1 to num_lines(header_field_matrix)
        ⎰ compress(local_differences[i])
1180 ⎱ compress(residual_list[i], local_differences[i])
        end
end
```

FIG. 12

| | TF | 0 | 1 | 2 | 3 | 4 | ... | n−3 | n−2 | n−1 |
|---|---|---|---|---|---|---|---|---|---|---|
| 1210 | GZ | 0 | 0 | 0 | 1 | 0 | ... | 0 | 1 | 1 |
| | $LZ_i$ | 1 | 0 | 1 | 0 | 1 | ... | 0 | 0 | 1 |
| | $DZ_i$ | 1 | 0 | 1 | 1 | 1 | ... | 0 | 1 | 0 |
| 1220 | $LOCAL\_DIFFERENCES_i$ | [COUNT($DZ_{ij}$ = 1), 0, 2, 3, 4, ..., n−2] | | | | | | | | |
| | $RESIDUAL\_LIST_i$ | [$e_0$, $e_2$, $e_4$, ..., $e_{n-1}$] | | | | | | | | |

FIG. 13

| VALUE | BINARY CODE | | |
|---|---|---|---|
| | PREFIX | SIGN (# OF BITS) | CODE (# OF BITS) |
| +/− [0, 15] | 1 | 1 | 4 |
| +/− [16, 31] | 01 | 1 | 4 |
| +/− [32, 63] | 001 | 1 | 5 |
| +/− [64, $2^{31}$−1] | 0001 | 1 | 32 |

1400

1500

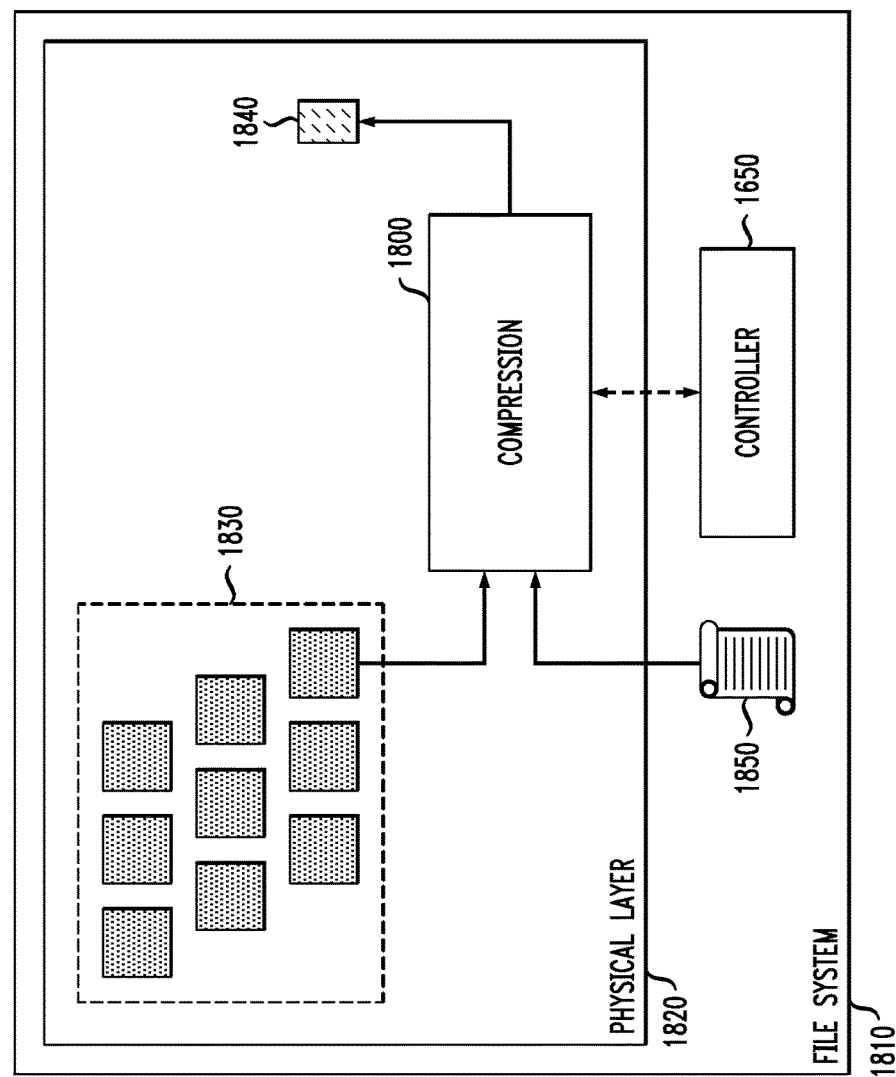
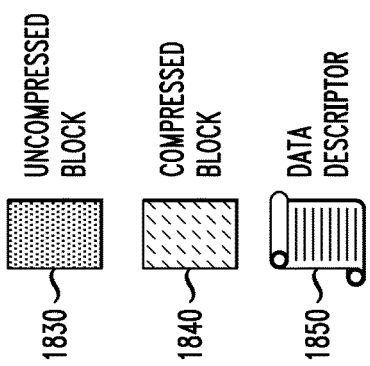
FIG. 18

DISTRIBUTION CONTENT-AWARE COMPRESSION AND DECOMPRESSION OF DATA

CROSS-REFERENCE TO RELATED APPLICATIONS

The present application is related to U.S. patent application Ser. No. 14/579,130, filed Dec. 22, 2014, now U.S. Pat. No. 9,660,666, entitled "Content-Aware Lossless Compression and Decompression of Floating Point Data," and U.S. patent application Ser. No. 14/749,826, filed Jun. 25, 2015, now U.S. Pat. No. 9,503,123, entitled "Random Access to Compressed Data Using Bitwise Indices," each incorporated by reference herein.

FIELD

The field relates generally to compression and decompression of signal data, such as seismic data.

BACKGROUND

Data compression techniques are commonly used to achieve a low bit rate in the digital representation of signals for efficient processing, transmission, and storage. The size of seismic datasets, for example, continues to increase due to the need of extracting oil from more complex geologies. This drives demand for better sensor acquisition technologies, higher resolution hydrocarbon models, more iterations of analysis cycles, and increased integration of a broader variety of data types. Thus, seismic data compression has become important in geophysical applications, for efficient processing, storage and transmission of seismic data.

A number of techniques have been proposed for efficient lossless compression of seismic data. U.S. patent application Ser. No. 14/579,130, filed Dec. 22, 2014, now U.S. Pat. No. 9,660,666, entitled "Content-Aware Lossless Compression and Decompression of Floating Point Data," for example, discloses techniques for content-aware lossless compression and decompression of floating point data, such as seismic data, and other data. The disclosed content-aware lossless compression algorithms employ observed phenomena in the data to obtain improved compression ratios and processing speeds, relative to conventional techniques.

Nonetheless, a need remains for improved compression and decompression techniques in a distributed computing environment.

SUMMARY

Illustrative embodiments of the present invention provide methods and apparatus for distributed content-aware compression and decompression of data, such as seismic data. In one exemplary embodiment, data is compressed by obtaining a file chunk of a plurality of file chunks of a larger file, a start offset of the file chunk within the larger file, and a data descriptor indicating how the file chunk should be processed based on characteristics of the larger file; classifying data inside the file chunk as one or more of headers and samples; compressing headers in the file chunk using one or more header compression techniques to obtain one or more compressed headers; compressing samples in the file chunk using one or more sample compression techniques to obtain one or more compressed samples; and packing the compressed headers and compressed samples into a single bit stream comprising a compressed version of the file chunk.

In one or more exemplary embodiments, a controlling agent divides the larger file into a plurality of file chunks and determines an association between each of the plurality of file chunks and the corresponding start offsets within the larger file. The controlling agent optionally locates and dispatches one or more of the file chunks to be independently compressed to one or more nodes in a distributed system, taking into consideration the compression descriptor and the start offset of the chunks. The controlling agent optionally controls and indexes the file chunks of the larger file that have been compressed and initiates a release of space occupied by the corresponding original data.

In one or more exemplary embodiments, the larger file comprises a seismic file. Trace headers of the seismic file are compressed using a content-aware substantially lossless compression technique that processes global field-by-field patterns to compress trace fields locally within one or more of the file chunks. A file chunk contains one or more trace headers and other data and wherein the method further comprises the steps of obtaining trace indices i related to the start offset of the chunk and, for each header field j of trace i, predicting a field value with a computed function of the obtained trace index i, computing an error in the prediction and storing a residual value and local differences indicating fields of the trace headers for which the prediction was substantially exact. A first chunk of the seismic file comprises textual headers and binary headers, and wherein the step of compressing the one or more headers employs an encoder selected based on a header type. Values of seismic data samples and headers are compressed using substantially lossless content-aware algorithms.

In at least one embodiment, the method is implemented in one or more of a physical layer of one or more storage nodes of a file system, a logical layer of one or more storage nodes of a file system and one or more compute nodes within one or more computing clusters. In addition, the compression method is optionally executed on demand by an external agent once data is in storage and/or in a background mode controlled by a storage operating system and transparent to an external agent.

In one or more exemplary embodiments, users can interact with the version of the file chunk substantially as if they were interacting with an uncompressed version of the file chunk.

In at least one embodiment, the compressed version of the file chunk is decompressed using an associated offset of an uncompressed version of the file chunk and the data descriptor. An unpacking step classifies data inside the compressed version of the file chunk as one or more of compressed headers and compressed samples using the associated offset and information in the data descriptor and wherein the method further comprises the steps of decompressing compressed headers in the compressed version of the file chunk using one or more header decompression techniques to obtain one or more uncompressed headers and decompressing samples in the compressed version of the file chunk using one or more sample decompression techniques to obtain one or more uncompressed samples.

Advantageously, illustrative embodiments of the invention provide improved distributed compression and decompression of data, such as seismic data. These and other features and advantages of the present invention will become more readily apparent from the accompanying drawings and the following detailed description.

BRIEF DESCRIPTION OF THE DRAWINGS

FIG. 8 is a flow chart illustrating an exemplary implementation of the compression step of FIG. 7 in further detail;

FIG. 9 is a flow chart illustrating an exemplary implementation of a decompression workflow;

FIG. 10 illustrates exemplary pseudo code for the initialization step of FIG. 7 for the compression of the trace headers of FIG. 4;

FIGS. 11A and 11B, collectively, illustrate exemplary pseudo code for the compression of the trace headers of FIG. 4 present in file chunks;

FIG. 12 is a sample table that stores the global zero (GZ) and local zero (LZ) values computed by the exemplary pseudo code of FIGS. 11A and 11B for the local compression of trace headers;

FIG. 13 illustrates an exemplary byte encoding table for trace header fields;

FIGS. 17 and 18 illustrate a compression process operating at a logical layer and a physical layer, respectively, of a file system.

DETAILED DESCRIPTION

Figure 1:
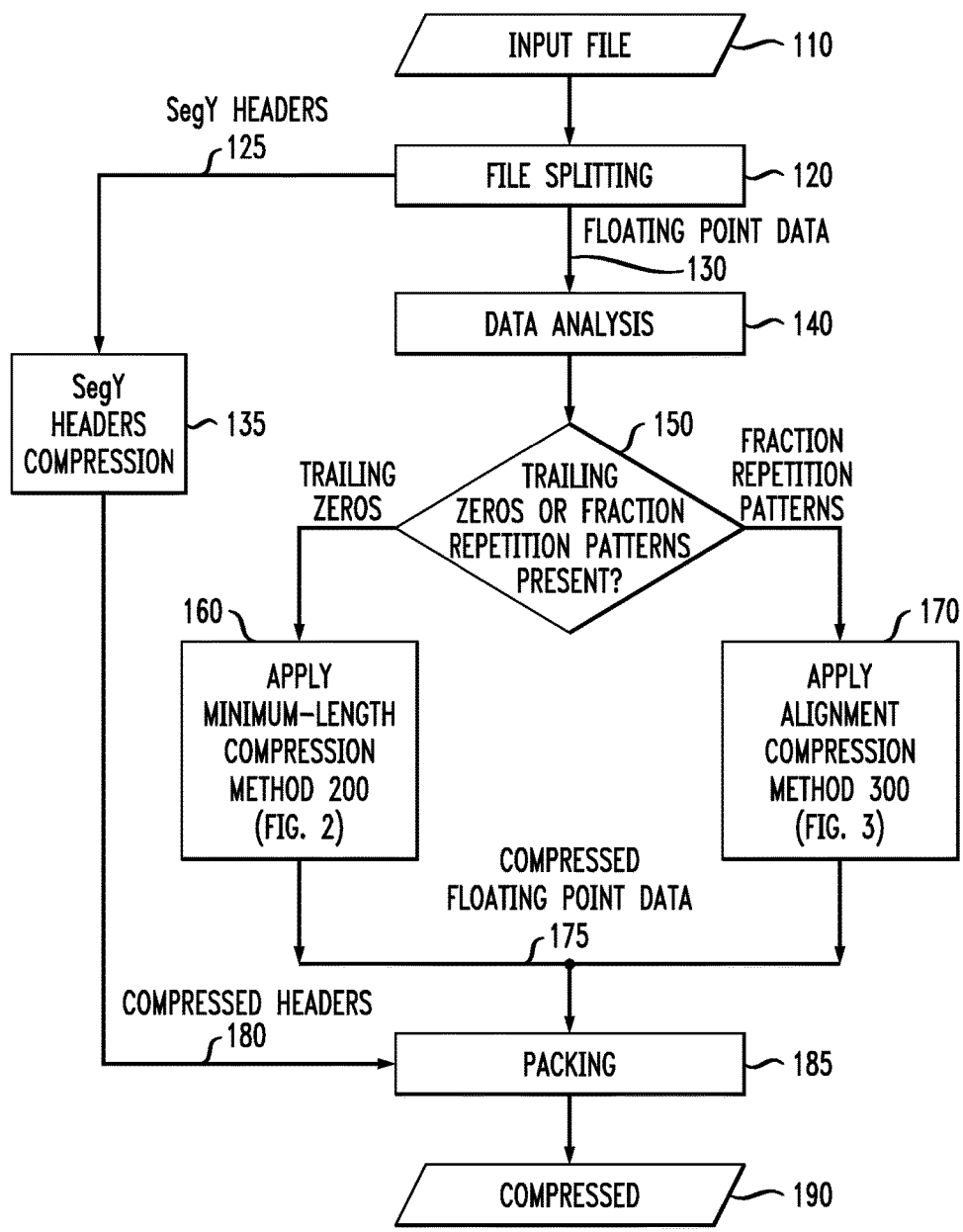
FIG. 1 is a flow chart illustrating an exemplary implementation of a data compression process.

Illustrative embodiments of the present invention will be described herein with reference to exemplary communication, storage and processing devices. It is to be appreciated, however, that the invention is not restricted to use with the particular illustrative configurations shown. Aspects of the invention provide methods and apparatus for distributed content-aware compression and decompression of data. While the exemplary embodiments are described herein using seismic data, aspects of the present invention can be applied to other forms of data, as would be apparent to a person of ordinary skill in the art based on the present disclosure.

One or more embodiments of the invention provide efficient, content-aware compression and decompression of seismic data using a distributed computing infrastructure. One or more exemplary embodiments divide input files, such as exemplary seismic files, into chunks of variable size and distribute file chunks across computing nodes, using existing techniques, for distributed content-aware compression of seismic samples and headers in accordance with aspects of the invention. One motivation for this approach is to achieve independence between the compute nodes that carry out the compression jobs. Such independency enables parallel, transparent access to the compressed data, on a chunk-by-chunk basis. Thus, there is no need to restore the original file in order to have access to the uncompressed data.

One or more exemplary embodiments distribute the compression computation across a plurality of computing nodes such that each compute node works on file chunks, in a parallel manner, without significantly affecting the compression ratios obtained by sequential versions of the content-aware lossless compression algorithms.

One exemplary aspect of the invention breaks SEG-Y headers and traces, when needed, when splitting a SEG-Y file into chunks across several compute nodes. As discussed further below, SEG-Y is a format of the Society of Exploration Geophysicists (SEG). One exemplary aspect of the invention compresses SEG-Y trace headers using both global and local information about their fields, making use of the disclosed compression descriptor. One or more embodiments employ linear prediction to take advantage of patterns identified in each field of the header, which combines global data awareness with chunk-based, local optimizations that enable massive parallelism, leading to an efficient strategy for any SEG-Y file.

According to another exemplary aspect of the invention, the disclosed distributed content-aware compression algorithms are agnostic with respect to the underlying storage and computing infrastructures while being highly scalable. The disclosed distributed content-aware compression algorithms can be implemented, for example, on several cores of the same central processing unit (CPU) accessing local storage, several nodes of a high performance computing (HPC) cluster attached to a storage area network (SAN), or, ideally, embedded in the nodes of a distributed, scale-out, networked attached storage (NAS), as discussed further below in conjunction with FIG. 16. The disclosed methods further enable the addition of more compute nodes without disrupting the reliability and effectiveness of the compression services.

The chunks of the seismic data can be seen both as segments of a file in a "logical" level of a file system or as blocks directly associated with the "physical" storage layer, as discussed further below in conjunction with FIGS. 17 and 18. In this way, the disclosed distributed content-aware compression algorithms can be embedded in a file system, making compression and decompression completely transparent, or implemented by application programming interfaces (APIs) used by clients running on computing clusters.

Various aspects of the invention provide an architecture, data structures, and algorithms to effectively and efficiently implement substantially lossless, content-aware compression and decompression of seismic data in a distributed environment. The compression is based on the creation of a compression descriptor that stores global information about the data and is distributed across compute nodes in an initialization step in order to enable massive parallelism during one or more embodiments of the independent compression and decompression of file chunks.

In at least one exemplary embodiment, the disclosed distributed content-aware compression techniques are based on exemplary data compression algorithms, referred to herein as content-aware lossless compression algorithms, introduced in U.S. patent application Ser. No. 14/579,130, filed Dec. 22, 2014, now U.S. Pat. No. 9,660,666, entitled "Content-Aware Lossless Compression and Decompression of Floating Point Data," incorporated by reference herein. The exemplary content-aware lossless compression algorithms provide a data oriented method for substantially lossless compression of floating point data, such as seismic data, and other data that employs observed phenomena in the data to obtain high compression ratios with fast algorithms. These data compression algorithms are modified as described herein to provide distributed content-aware lossless compression algorithms.

The exemplary content-aware lossless compression algorithms comprise a minimal-length compression technique, discussed further below in conjunction with FIG. 2, and an alignment compression technique, discussed further below in conjunction with FIG. 3. The minimal-length compression technique classifies the samples so that codes describing both the exponent and the length of the significand can be used to keep only the necessary bits to represent each sample. An alignment compression technique exploits repetition patterns that can be observed in the samples when they are aligned to the same exponent, so that numbers can be broken into parts that repeat frequently and other parts that do not. The two content-aware lossless compression algorithms are optionally combined with prediction models that aim at reducing the entropy of the data. A data analysis step is employed to decide which content-aware lossless compression algorithm is the best for each input dataset, as discussed further below in conjunction with FIG. 1. Each algorithm further provides versions for fast compression and decompression (Turbo Version) or for maximum compression (Max Version).

While the exemplary embodiments employ the content-aware lossless compression algorithms as the compression algorithm, alternate compression algorithms, such as Huffman coding and Lempel-Ziv coding, or variations thereof, can be employed, as would be apparent to a person of ordinary skill in the art.

In addition, in one or more exemplary embodiments, the disclosed distributed content-aware lossless compression algorithms provide massively-parallel access to compressed data transparently, in such a way that clients can interact with the data as if they were accessing the original, uncompressed files.

Such capability is an inherent feature of the Turbo versions of the content-aware lossless compression algorithms, since they do not depend on data correlations, meaning that the compression/decompression of one data sample does not depend on other data samples. According to a further aspect of the invention, the transparent access to the compressed data is enabled through storing in an index table a bitwise mapping of individual bits in the compressed file to corresponding portions of the uncompressed version. The Max versions of the content-aware lossless compression algorithms, however, have a limited dependence on data correlations. In order to enable transparent access to data compressed with the Max versions of the said compression algorithms, the state of the compression algorithm that compressed the compressed file at a time that the given individual bit was compressed is stored along with the bitwise mapping.

As discussed hereinafter, one or more embodiments of the invention address a number of challenges with respect to distributed processing for the exemplary content-aware lossless compression algorithms, including how to leverage overall compression and decompression speeds through file splitting and distributed computations while still taking advantage of global data awareness in order to achieve high compression ratios. This challenge becomes more evident in the compression of headers, given that the headers in content-aware lossless compression algorithms were all separated from the input SEG-Y file and compressed altogether.

The disclosed distributed content-aware, header compression algorithms compress headers (trace headers, in particular) substantially independently, while taking into account local and global header characteristics present in the input file.

Content-Aware Lossless Compression Algorithms

FIG. 1 is a flow chart illustrating an exemplary implementation of a data compression process 100. The exemplary data compression process 100 processes seismic data stored in SegY files. Compression of other kinds of floating point data can be adapted from the exemplary embodiment, as would be apparent to a person of ordinary skill in the art. Overall, an input file 110 is split into SegY headers 125 and floating point data values 130 at a file splitting stage 120. The SegY headers 125 are compressed during step 135, for example, with standard entropy encoders.

The floating point data values 130 are processed during step 140 to determine which compression technique 200, 300 is the best for the input file 110, and will follow one of two possible workflows. The data analysis 140 can be carried out on random, small subsets of the input file 110. Statistics on the length of significands of floating point data and on repetition patterns are obtained and ranked. By dividing the input file 110 into chunks, the choice of the compression workflow can optionally be optimized on a chunk-by-chunk basis, enabling the compression of several chunks to be executed in parallel, to maximize performance.

A test is performed during step 150 to determine if trailing zeros or fraction repetition patterns are present in the input file 110. If it is determined during step 150 that trailing zeros are present, then program control proceeds to step 160 for compression using the minimum-length compression method 200 (FIG. 2) to process floating point data that can be trimmed. If, however, it is determined during step 150 that fraction repetition patterns are present, then program control proceeds to step 170 for compression using the exemplary alignment compression method 300 (FIG. 3). As discussed further below in conjunction with FIGS. 2 and 3, each workflow type can optionally be tuned for turbo or maximal compression.

Finally, compressed floating point data values 175 and compressed headers 180 are applied to a packing module during step 185, which organizes the compressed floating point data values 175 and compressed headers 180 in one or more compressed files 190 for access by a decompressor.

The algorithms for decompressing the compressed data are straightforward to a person of ordinary skill in the art, based on the discussion of the compression algorithms provided herein. The execution times of the decompression algorithms vary between 50% and 100% of the compression times. Thus, the remaining discussion focuses primarily on the description of the compression algorithms.

Min-Length Compression

Figure 2:
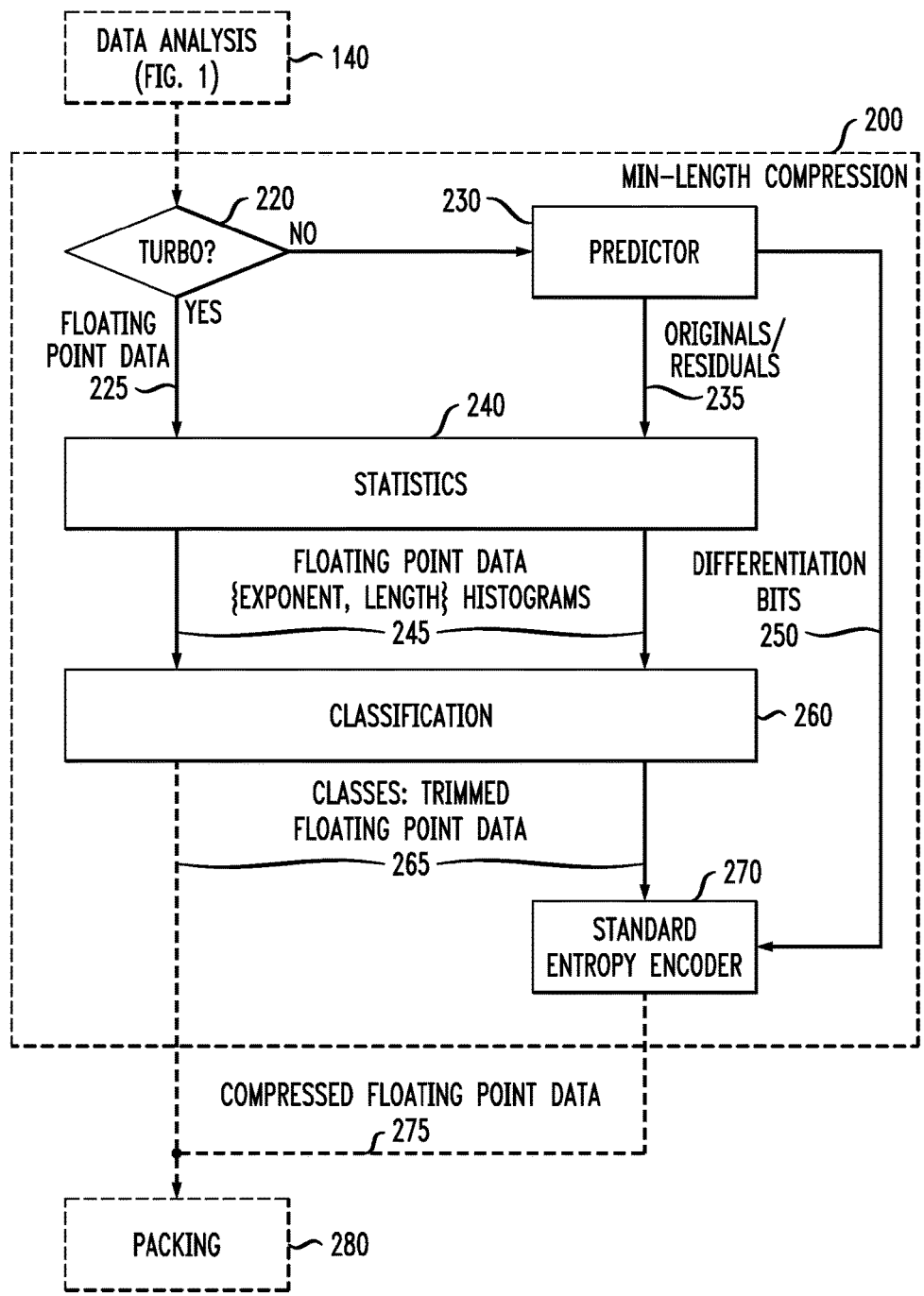
FIG. 2 is a flow chart illustrating an exemplary implementation of a minimum-length compression method.

FIG. 2 is a flow chart illustrating an exemplary implementation of the minimum-length compression method 200. As previously indicated, the exemplary minimum-length compression method 200 compresses the input file 110 by removing unnecessary trailing zeros from significands. If zeros are removed from the original data, this information needs to be stored so that the original number can be rebuilt in the decompression phase, without data loss. Bookkeeping for such information for every sample can be costly and may result in poor compression performance. The exemplary minimum-length compression method 200 balances the removal of zeros and the bookkeeping. As discussed above, the minimum-length compression method 200 can optionally be tuned for turbo or maximal compression.

Thus, a test is performed during step 220 to determine if a turbo compression or a maximal compression will be performed. If it is determined during step 220 that a turbo compression will be performed, then program control proceeds directly to step 240 to process the floating point data 225.

The exemplary minimum-length compression method 200 works in two passes through the data. In the first pass, statistics on the lengths of the significands and their correlation with the corresponding exponents are gathered during step 240. The length of a significand is defined as the number of bits from the bit of highest order to the lowest order bit one preceding the sequence of trailing zeros. Every {exponent, length} pair is defined as a class and the statistics indicate how many bits can be saved if a specific code is created for that class and the trailing zeros of the significand of the samples of that class are removed. The output of the statistics phase 240 is a collection of histograms 245 of {exponent, length} pairs.

Given a (configurable) superior limit, N>0, to the number of classes to be represented, the exemplary minimum-length compression method 200 carries out a second pass through the input file 110 during step 260, removing zeros from samples of those classes in the histogram data 245 that will yield the best compression ratios in the trimmed floating point data 265. The referred superior limit N determines how many bits are necessary to store class codes associated with {exponent, length} pairs. The remaining classes are optionally grouped so that the highest number of zeros can be removed with the least amount of bookkeeping.

For classes associated with {exponent, length} pairs, let $B_c = \lceil \log_2 N \rceil$ be the number of bits necessary to store class codes, $B_s = 1$ be the number of bits to store the sign of the floating point number, and $B_l$=length be the number of bits to store its significand. The classification of the samples during step 260 creates six types of classes:

Classes that represent a single exponent and a single length: in this case, for each sample, $[B_s+B_c+(B_l-1)]$ bits are stored, since the least significant bit of the significand is known to be 1 and, as such, does not need to be stored.

Classes that represent, for a single exponent, all lengths equal to or less than the length representative of the class: in this case, $[B_s+B_c+B_l]$ bits are stored for each sample (note that the least significant bit needs to be stored).

Classes that combine consecutive exponents that can be aligned, having a maximum length: in this case, $[B_s+B_c+B_l+1]$ bits are stored. Notice that the most significant bit 1 of the significand, which is hidden in the IEEE 754 format, has to be explicitly represented when numbers having different exponents are mixed, so that the alignment can be reverted upon decompression.

Classes that combine pairs of exponents that have different lengths: in this case, each sample can be represented by one extra bit that distinguishes the case of one exponent from the other and the corresponding length minus one bit, since we do not need to store the least significant bit. Thus, $[B_s+B_c+B_l]$ bits are stored for each sample of these classes.

Classes that combine exponents that only have associated lengths of zero or one bit: in this case, no bits of the significand are stored, only a code with $B_z = \lceil \log_2 N_z \rceil$ bits (wherein $N_z$ is the total number of zero-length classes), which will enable the reconstruction of the class at the decompression time. Consequently, $[B_s+B_c+B_z]$ bits are stored.

Classes that handle exceptions: the IEEE 754 format specifies special binary codes for numbers that cannot be represented (also known as "not-a-number", or NaN). These are stored as members of the zero-length classes, in their original form (i.e., with 32 bits), with $[B_s+B_c+B_z+32]$ bits in total.

The grouping of the classes is performed in such a way that most of the samples have a code that exactly specifies the exponent and the length. Classes that group exponents and lengths are chosen to substantially maximize the overall result. As the representation of the samples in these classes demand additional bits, combinations of exponents and lengths that have lower rates in the statistics are chosen to be grouped. Typically, for each exponent, longer lengths that do not have high frequencies are grouped. Additionally, short lengths, all of them with low frequencies, are grouped in a single class.

The size of the code is a (configurable) parameter of the minimum-length compression method 200, which may be defined as either 5 or 6 bits, for example.

If it is determined during step 220 that a maximal compression will be performed, then a prediction is performed during step 230, before program control proceeds to step 240 to process the original values and residual values 235. The variation of the minimum-length compression method 200 for maximum compression works in a similar manner as the turbo version described above. The difference is that a linear prediction algorithm is employed during step 230 to predict the value of every data sample based on a sequence of previous samples. A number of exemplary algorithms are available. See, for example, Monson H. Hayes, "9.4: Recursive Least Squares," Statistical Digital Signal Processing and Modeling, p. 541 (Wiley, 1996); or U.S. patent application Ser. No. 14/230,510, filed Mar. 31, 2014, now U.S. Pat. No. 9,858,311, entitled "Heteroscedastic Data Compression Using Arima-Garch Model Estimation," each incorporated by reference herein.

Generally, a linear prediction algorithm is employed during step 230 in order to use a prediction error, or residual, as the input for the compression algorithm, instead of the original data. Depending on the quality of the employed predictor, the residual can be very small. Consequently, it would need fewer significant bits to be represented, in comparison with the original data, resulting in more effective compression.

In the case of floating point data, the residual could have a longer length, even if its absolute value is lower than that of the original value. To ensure that the residual values demand fewer bits than the original values, the following strategy is adopted in the exemplary embodiment:

During compression, the prediction and the original value are aligned to the same exponent, and the prediction is truncated at the bit that precedes the least significant bit 1 of the original value. By doing this, the least significant bit of the residual will be the least significant bit 1 of the original value when they are aligned. If the absolute value of the residual is lower than that of the original value, its length is equal to or shorter than that of the original value when the exponents are restored.

During decompression, the residual value is aligned with the prediction (which is the same prediction originated at compression time) and the prediction is truncated at the bit that precedes the least significant bit 1 of the residual. The residual is then added to the prediction in order to exactly obtain the original value.

On average, it has been observed that residuals are indeed "shorter" than the original data samples. In order to maximize the compression ratios even further, the residual is replaced with the original sample whenever the former needs, in reality, more bits to be represented. Only one bit of bookkeeping, referred to in FIG. 2 as a differentiation bit 250, is necessary to differentiate between the two types, therefore with minimal impact. As the frequency in which residuals are longer than the original values is low, the compression of this differentiation bit 250 is very high, so that this differentiation tends to increase compression ratio.

In the maximum compression mode, the trimmed floating point data 265 generated by the classification 260 and the differentiation bits 250 are further processed using an entropy encoder 270, in a known manner.

Finally, compressed floating point data values 275 are applied to a packing module during step 280, which organizes the compressed floating point data values 275 in one or more compressed files for access by a decompressor.

Alignment Compression

Figure 3:
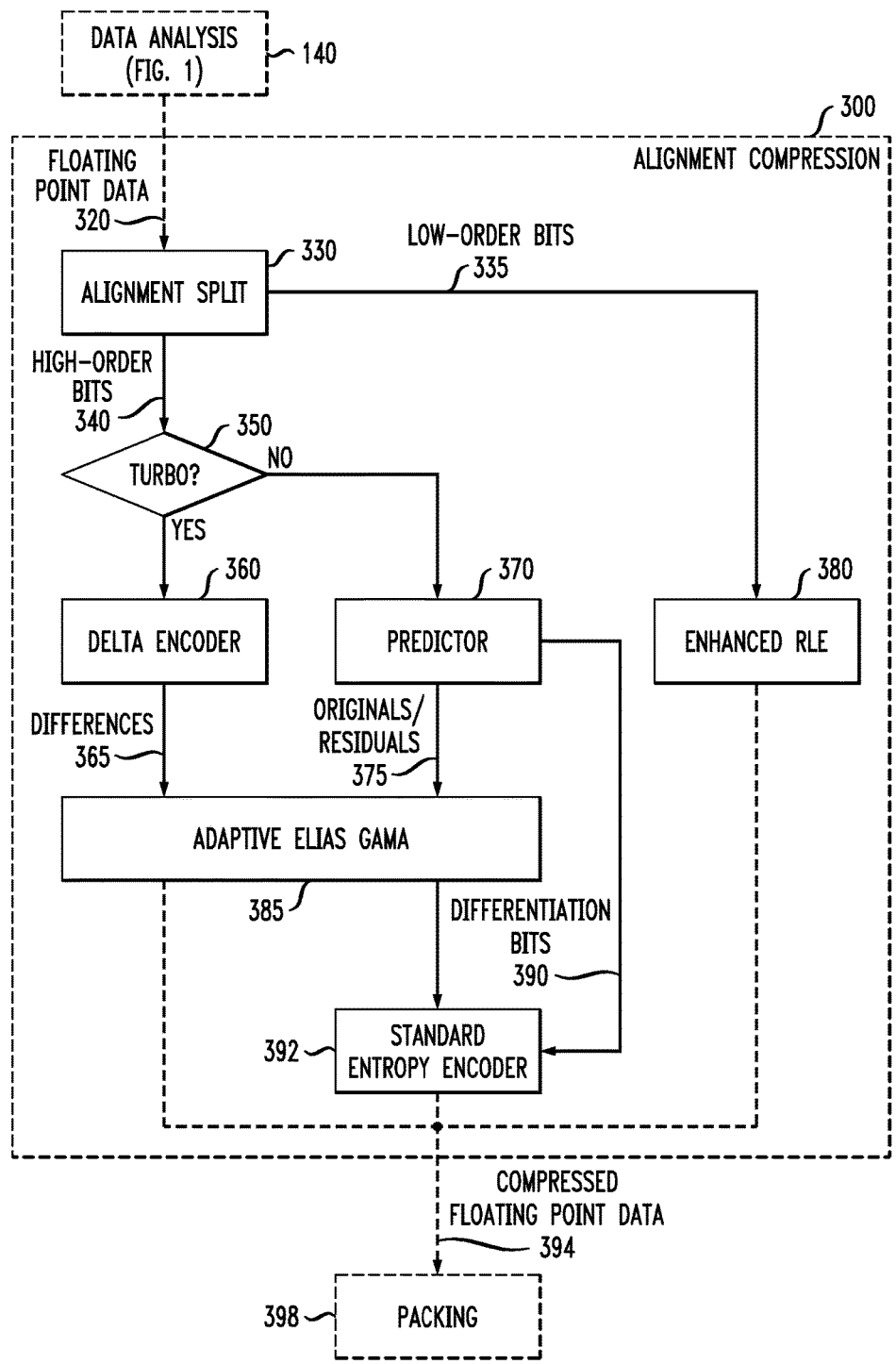
FIG. 3 is a flow chart illustrating an exemplary implementation of an alignment compression method.

FIG. 3 is a flow chart illustrating an exemplary implementation of the alignment compression method 300. The exemplary alignment compression method 300 leverages repetition patterns in the fractional part of the seismic floating point data, as described above, for improved compression.

Existing compression algorithms are specialized in data deduplication. Although many existing compression algorithms are able to cover a large spectrum of repetition patterns, the alignment compression method 300 employs more in-depth analyses of patterns present in seismic sample data and is therefore fine-tuned for the compression of such type of data.

Generally, the alignment compression method 300 recognizes that the repetition patterns occur primarily in the fractional part of the sample data. Due to sensor precision limitations, only a restricted set of fractions might be represented during data acquisition. These fractions occur frequently, and they also tend to repeat in alternating patterns along extended sequences of samples. Having that in mind, the alignment compression method 300 works by splitting the input floating point data 320 into integral and fractional parts during step 330. Splitting a floating point number means to find the bit of the significand that corresponds to the location of the radix point, taking into account the exponent of the number. A "high order" (integral) significand 340 and a "low order" (fractional) significand 335 are generated as a result of this process. The splitting performed during step 330 can be done in one of two possible ways:

Align the number to the exponent zero (most typical approach). In this case, the split precisely defines the integral and fractional parts of the number.

Align the number to a calculated exponent. Since alignment involves binary shifting operations within 32 bits, it might not be possible to align the number to the zero exponent, depending on the distribution of the exponents across the data samples. As a result, the "central" exponent is calculated from this distribution, and all the samples are aligned to that exponent.

Whichever align/split option is chosen for step 330, there will probably be cases in which the operation cannot be done. Those will be treated as exceptions in a later step of the exemplary alignment compression method 300, described further herein. From the data analyses, it has been observed that these exceptions have very low frequency, and therefore cause minimal impact on the compression performance.

In either case, the low order part 335 resulting from the split operation must still be aligned (usually with the most significant bit of the significand) so that the repetition patterns appear in binary form.

As discussed above, the exemplary alignment compression method 300 can optionally be tuned for turbo or maximal compression, which has an impact on the integral part of the data only. Thus, a test is performed during step 350 to determine if a turbo compression or a maximal compression will be performed. If it is determined during step 350 that a turbo compression will be performed, then program control proceeds to step 360, wherein a delta encoder is applied to the high order bits 340.

The exemplary alignment compression method 300 works in a single pass through the integral data. Since the data samples are a discretization of a physical phenomenon, it is expected that the difference between the integral (or high order) part of subsequent samples (i.e., an approximation of the derivative of the function corresponding to the phenomenon) will be small. In effect, this pattern can be observed throughout the data. The first step of the algorithm following the split/align operation is thus the delta encoder during step 360. The delta encoder receives as input the original samples and outputs the differences 365 between each sample and the previous one. Since the differences 365 between the integral part of subsequent samples are overall small, their entropy tends to be lower than that of the input samples.

The differences 365 between the integral part of subsequent samples are encoded during step 385 using an adaptive Elias Gama entropy encoder. See, for example, P. Elias, "Universal Codeword Sets and Representations of the Integers," IEEE Trans. on Information Theory, Vol. 21, No. 2, pp. 194-203 (March 1975), incorporated by reference herein. The Elias Gama encoder is suited for geometric probability distributions of numbers x, of the form $P(x)=(1-p)^{x-1}p$, where p is a constant less than 1. Such distributions indicate that small numbers (i.e., needing fewer bits to be represented) occur much more frequently than large numbers. The encoder transforms input numbers into codes of variable length, by fitting them into bins whose sizes are increasing powers of 2, that is, 2, 4, 8, 16, 32, 64, etc. A number N to be encoded is calculated as $N=2^{bin-index}+(N \text{ modulo } 2^{bin-index})$ and is thus represented by the bin-index in unary form (a sequence of bin-index zeros) followed by the binary form of the result of the modulo operation, which by definition requires bin-index bits to be represented. Following this scheme, the alignment compression method 300 will encode the most frequent numbers with very few bits.

The Elias Gama algorithm is extended to make it adapt to distributions that do not exactly follow the pattern of the form $P(x)=(1-p)^{x-1}p$, but still have small numbers occurring more frequently. Generally, the inferior limit of the encoding bins is increased, so that they start at the point in which the data seems to more closely fit a geometric distribution, while the superior limit is reduced to the point where the highest number within the data can be represented.

To cope with the align/split exceptions discussed above, an extra bin is added, in which the samples falling in that category are represented in their original form.

If it is determined during step 350 that a maximal compression will be performed, then a prediction is performed during step 370 to reduce the entropy of the integral part of the input data, before program control proceeds to step 385 to process the original values and residual values 375. The variation of the alignment compression method 300 for maximum compression works in a similar manner as the turbo version described above. The difference is that an integer linear prediction algorithm is employed during step 370 to predict the value of the integral part of every data sample based on a sequence of previous samples. A number of exemplary algorithms are available. See, for example, Monson H. Hayes, "9.4: Recursive Least Squares," Statistical Digital Signal Processing and Modeling, p. 541 (Wiley, 1996); or U.S. patent application Ser. No. 14/230,510, filed Mar. 31, 2014, entitled "Heteroscedastic Data Compression Using Arima-Garch Model Estimation," each incorporated by reference herein. The choice of predictor follows the same reasoning described above for the minimum-length compression method 200, including the strategy of truncating the residuals in case they need more bits to be represented than the original data and the compression of the differentiation bits 390 with standard entropy encoders.

Generally, a linear prediction algorithm is employed during step 370 in order to use a prediction error, or residual, as the input for the compression algorithm, instead of the original data. Depending on the quality of the employed predictor, the residual can be very small. Consequently, it would need fewer significant bits to be represented, in comparison with the original data, resulting in more effective compression.

The delta encoder 360 is not used in the maximum compression mode, since the combination of residuals and original values may no longer have the same differentiability patterns observed in the original data alone.

The original values and residual values 375 generated by the prediction 370 are encoded during step 385 using the adaptive Elias Gama entropy encoder, in the manner described above for the turbo mode. The output of the adaptive Elias Gama encoder 385 is provided to an entropy encoder during step 392, in a known manner, so that any pattern still present in the encoded data is identified and further compressed.

The fractional part (or low order bits 335) generated by the alignment split 330 is processed by an enhanced Run-Length Encoding (RLE) algorithm during step 380. Overall, the Run-Length Encoding (RLE) algorithm is effective when the same symbol appears throughout long sequences of data. In the exemplary alignment compression 300, the enhanced Run-Length encoding 380 more thoroughly exploits the alternating repetition patterns observed in the low order bits 335.

It has been observed that the sequences of repetitions of fractions follow an even more interesting pattern of repetition, in which pairs of sequences of symbols (numbers) alternate between them, i.e., AAAAAABBB-BAAAABBBBBBBAAAACCCCDDDDC-CCCCCDDDEEEEFFFFEE . . . .

In order to achieve compression ratios with an average count of less than one bit per sample, an enhanced form of the Run-Length encoding algorithm has been devised to cope with the patterns above. In this form, two concepts are dealt with:

A Block represents a sequence of repetitions of the same symbol, e.g., A6, B4, A4, B7, A4, C4, D4, C6, etc. are blocks of the sequence above.

A MegaBlock (MB) represents a sequence of repetitions alternating two symbols, e.g., $MB_1$=(A6, B4, A4, B7, A4), $MB_2$=(C4, D4, C6, D3), etc.

One MegaBlock is thus described by the number of blocks it contains and the two symbols that alternate, the first one being the symbol of the first block of the sequence. By doing this, only the number of repetitions (or block sizes) of each symbol needs to be encoded within the MegaBlock. Additionally, since the number of unique fractions tends to be small, a dictionary is created to store them. As a consequence, the MegaBlocks do not need to store the repeating fractions themselves, only their location in the dictionary. Finally, in order to save extra bits per MegaBlock, some metadata are added to each MegaBlock to indicate how many bits are strictly necessary to store dictionary locations and blocks sizes. A MegaBlock $MB_i$ is thus defined as:

$MB_i$=($N_b$, $B_d$, $D_1$, $D_2$, $B_b$, $BL_1$, $BL_2$, $BL_3$, . . . , $BL_{Nb}$), wherein $N_b$ represents the total number of blocks in the mega block, $B_d$ is the number of bits necessary to store dictionary locations $D_1$ and $D_2$ of the two repeating symbols, $B_b$ is the number of bits necessary to store each block size, $BL_1$ is the block size of the symbol in the position $D_1$ of the dictionary, $BL_2$ is the block size of the symbol in the position $D_2$ of the dictionary, $BL_3$ is the block size of the symbol in the position $D_1$ again, and so on.

For example, $MB_1$ above would be defined as $MB_1$=(5, 2, 1, 2, 3, 6, 4, 4, 7, 4), for a dictionary D=(A, B, C, D, E, F) derived from the example sequence. Note that only two bits would be necessary for dictionary locations and only three bits would be necessary for block sizes, since the largest dictionary position is two (knowing that ($\log_2$ 2)+1=2) and the largest block size is represented by number six (knowing that [$\log_2$ 6]=3).

At the end, compressed floating point data values 394 are applied to a packing module during step 398, which organizes the compressed floating point data values 394 in one or more compressed files for access by a decompressor.

Distributed Content-Aware Lossless Compression Algorithms

Distributed Computing of Seismic Data

Oil and Gas companies acquire and process seismic data from a prospect area. Seismic acquisition consists of creating acoustic waves using a source, such as a vibrator unit, dynamite shot, or an air gun, and then data collection related to the reflected waves. The signals are collected by means of receivers called geophones (when the acquisition occurs onshore) or hydrophones (when it occurs offshore). The receivers convert acoustic vibrations into streams of digital samples having, in general, a number of bits from 8 to 32 bits. Samples are continuously collected at intervals that have a constant duration (typically between 2 and 8 milliseconds) and data is collected from many shots simultaneously. Seismic samples are often stored as seismic traces, the length and number of which being directly related to the extent of the area being observed, its depth, and the sampling interval of the acquisition. Traces are persisted in files using one of several standards developed by the Society of Exploration Geophysicists (SEG) for storing seismic data. The most commonly used format is SEG-Y. Besides storing samples, SEG-Y files also contain headers which provide meta-information about the samples and which are present both at the beginning of the file and before each trace.

Seismic datasets can have many petabytes of raw data and their processing generates other additional datasets at various points throughout the seismic processing steps. Distributed, network attached storage (NAS) systems are a natural environment for storing these huge datasets, given their intrinsic scale-out capabilities. Likewise, High Performance Computing (HPC) environments are often used in seismic processing applications. Distributed compression thus comes as a solution to help Oil and Gas companies exploit the computing power of their existing storage or distributed computing facilities while reducing costs in storing and maintaining seismic datasets in such environments.

Typically, distributed computing is implemented by breaking the data to be processed into units that are assigned to different compute nodes. When implementing compression in a distributed computing environment, however, achieving high compression efficiency while maintaining reliability becomes a real challenge. For instance, when seismic files are split across the compute nodes, there is no guarantee that SEG-Y files will be split in such a way to keep headers and seismic traces in their original forms. An effective and reliable distributed computing algorithm must take this and other aspects into account, as shall be described next.

Subdivision of SEG-Y Files

In a distributed storage architecture, a file is often striped across storage nodes to improve storage use, data access efficiency, and failover capabilities. When thinking of a distributed compression algorithm, the subdivision of a file into chunks is a natural way of scaling up the algorithm execution across many compute nodes. A generic compression algorithm could then simply work on independent file chunks in order to maximize CPU usage. It has been shown that the exemplary distributed content-aware lossless compression algorithms can largely improve the compression of seismic data.

As mentioned above, the most commonly used type of files in Seismic Data Acquisition is called SEG-Y, whose format has been defined by the Society of Exploration Geophysicist consortium. The original format was published in 1975 and was originally developed for storing data in magnet tapes. Since then, the format has gone through several updates and has been largely adopted by Oil and Gas Companies.

Figure 4:
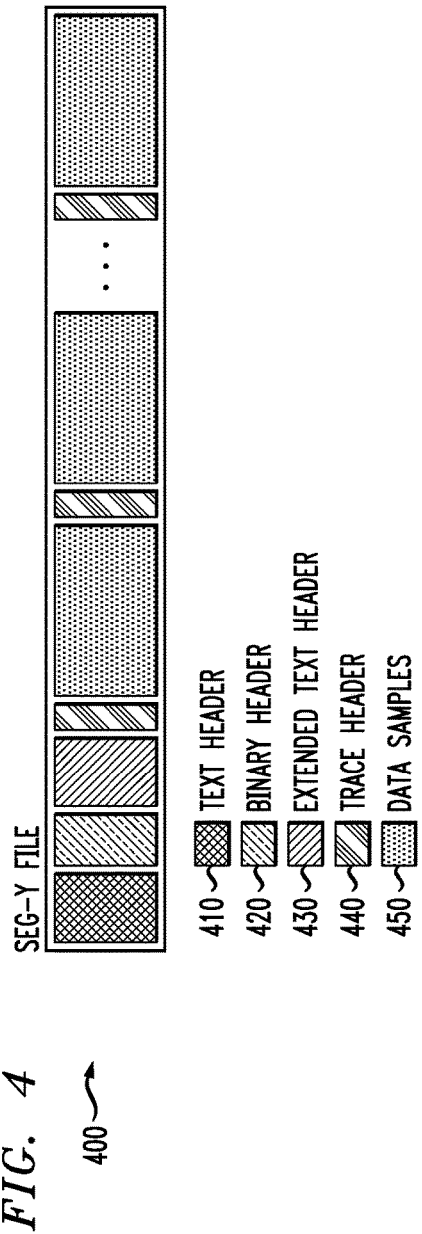
FIG. 4 illustrates an exemplary SEG-Y file structure of the Society of Exploration Geophysicists (SEG)

FIG. 4 illustrates an exemplary SEG-Y file structure 400. As shown in FIG. 4, the exemplary SEG-Y file structure 400 is organized as follows:

Text Header 410: comprises 40 lines of human readable textual information about the Seismic Acquisition, generally filled manually. Although the pattern requires this first header, it is not universally used. This header appears once at the beginning of the file and may have extensions. It has 3200 bytes in size.

Binary Header 420: comprises a 400-byte record that contains important information about the file itself such as sample interval, trace length, and data encoding, among others. This header appears only once.

Text Header Extensions 430: comprises extensions of the text header, if any, appear next to the binary header. Their number is marked in the binary header and each extension has 3200 bytes.

Trace Header 440: comprises relevant information about the subsequent collection of data samples (also known as trace) attributes like shot point number, geo-positioning, measurement units and constants defined. It appears before every trace of the file and each header has 240 bytes.

Data Samples 450: comprises amplitudes recorded by the geo-phones or hydro-phone, organized into a series of samples. This is the largest fraction of the SEG-Y file, representing around 90% of it.

The exemplary distributed content-aware lossless compression algorithms separate SEG-Y headers 410, 420, 430, 440 from seismic samples 450 and carry out specific compression algorithms for each of them, as discussed further below in conjunction with FIG. 8. Consequently, a distributed implementation of the compression workflow presented in FIG. 1 would need to take special care with situations in which the subdivision of SEG-Y files would break headers and traces.

Figure 5:
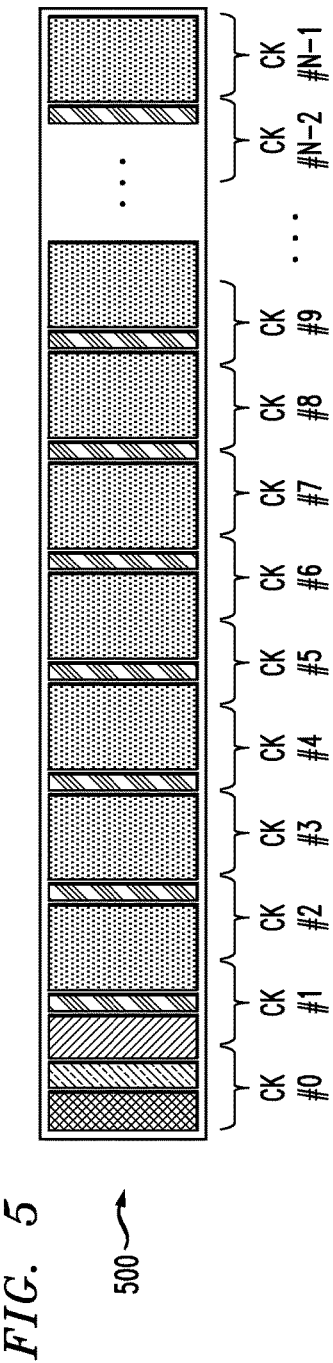
FIG. 5 illustrates an arbitrary subdivision of a SEG-Y file into chunks.

FIG. 5 illustrates an arbitrary subdivision of a SEG-Y file 500 into chunks (CK) 0 through N−1. Note that the subdivision could break headers and traces, making it difficult for the compression algorithm to correctly process each chunk CK. The challenge is to know whether a certain file chunk contains sample data, header data, or a combination of both, and how to process only portions of them.

In addition, a SEG-Y file 500 can only be correctly processed once information about its contents has been read or inferred from the headers 410, 420, 430, 440. If compute nodes were only concerned with the compression of the file segments assigned to them, they would not know how much of the segment would correspond to header or sample data. Therefore, a mechanism to provide nodes with the minimal necessary information for the compression to be correctly executed is called for.

Effectiveness and Efficiency

As noted above, a distributed compression algorithm should take advantage of file subdivision strategies to enable the parallel compression and decompression of different portions of the original file in different compute nodes. Ideally, compute nodes should exchange as little information as possible between them. In the compression context, this would mean that each compute node would compress file segments as independently as possible from other compute nodes.

The difficulties that arise in this scenario are related to the nature of the content-aware lossless compression algorithms discussed above in conjunction with FIGS. 1-3, and, in particular, to how the content-aware lossless compression algorithms depend on the analysis of the data present in the file. The minimum-length compression method 200, for example, computes global statistics of {exponent, length} classes in order to choose those classes that will yield the best compression ratios. The alignment compression method 300, in turn, builds a dictionary of fractions to take advantage of their repetitions throughout the file. Finally, the compression of headers is carried out with encoders that also take advantage of compressible patterns that appear across the entire file.

In order to cope with such difficulties, one aspect of the invention provides a global data structure, discussed further below in conjunction with FIG. 6, that is passed between compute nodes so that the referred statistics and dictionaries can be updated. Nevertheless, this could potentially incur considerable levels of message passing between nodes; compromising network traffic and possibly making the algorithms perform less efficiently.

One solution would be to effectively process file segments independently, taking into account the statistics and patterns existing solely within them. The risk, though, would be the degradation of the compression ratios, since class statistics for the minimum-length compression method 200 and fraction dictionaries for the alignment compression method 300 could be affected if file segments were compressed individually. Likewise, the compression of headers present in file segments could be less effective than compressing all the headers present in a file. A distributed, seismic data compression algorithm must thus yield compression ratios that are equivalent to those obtained with the coalesced version of the seismic file, while guaranteeing that samples and headers are correctly processed even if they are split in the file subdivision process.

Reliability

Seismic files are generated through expensive acquisition infrastructures. Consequently, the information stored therein is often delicate. Since it is expected that the original, uncompressed files will be discarded after being compressed, compression must be done substantially without loss of information. Achieving high compression ratios efficiently while being reliable is what makes the compression process viable to the Oil and Gas companies. Reliability must therefore not be substantially compromised when deploying the compression algorithms in a distributed environment.

Decompression Time and Space

If seismic data files are stored in compressed form and need to be used in a seismic processing workflow, they generally need to be decompressed first. As a consequence, users typically have to wait until the original files are regenerated before they can access the data.

Additionally, the reconstructed file will waste the users' storage space.

If parts of the file (for instance specific seismic traces) could be accessed without having to decompress the whole file, it is possible to save storage space without hindering the flow of execution. In fact, as some seismic processing workflows are Input/Output (I/O) intensive, if less (i.e., compressed) data is read from disk, the overall workflow performance can even be improved. If the file I/O access is mimicked, workflows can work accessing the compressed data as if they had been previously decompressed.

This process only becomes viable when small portions of the data (e.g., seismic samples) can be decompressed independently. In an environment where files are already subdivided into segments that are compressed independently, such decompression independency essentially comes "for free". Yet, the challenge is how to maintain data independency, so as to enable efficient random access to portions of the compressed data, while keeping high compression ratios.

Access to Partially Compressed Files

When deploying a data compression service in a storage architecture, there are in general two approaches to use the service. In a first approach, the compression is executed on demand, meaning that it is explicitly triggered by an external agent once the data are residing in the storage. The external agent waits until the compression service has completed before interacting with the compressed data, either explicitly (through requests directed to the compressed data) or implicitly (in which the storage's operating system provides transparent access to the compressed data).

With the first approach, an external agent (e.g., a user or a software component) interacts with the file system and decides the best moment to trigger the compression service. The service blocks access to the (compressed) data until the compression is finished. From that moment onward, applications are free to access the compressed data.

In a second approach, the compression is executed in the background, being controlled by the storage operating system and transparent to any external agent. The external agent interacts with the compressed data without knowing whether it is being compressed or not, or even which parts have already been compressed. Despite the fact that it is a responsibility of the operating system of the storage system to manage which portions of a file are compressed and which are not, such management depends largely on how the compression services provide access to those portions that are compressed.

With the second approach, external agents have no knowledge about when or how the compression service will start and complete. Thus, data requests might be satisfied both with compressed and uncompressed portions of the data. Consider, for example, HPC applications such as Reverse Time Migration® and Kirchoff Migration, used in seismic processing workflows. See, for example, Ö. Yilmaz, "Seismic Data Analysis: Processing, Inversion, and Interpretation of Seismic Data," Society of Exploration Geophysicists (2001). In these applications, seismic samples and traces are grouped in "gathers" and processed together. Since such gathers tend to be spread throughout the seismic data file, it is easy to imagine that if the file is being compressed in the background, some parts of the file will still be uncompressed, while others will have to be decompressed on demand in order to be provided to the applications. A distributed compression algorithm must thus allow the file system to have access to compressed and uncompressed portions of the same file at all times, without affecting the overall file access performance.

Management of Computing Resources

It has been shown that idle CPU time is a valuable resource in storage systems. In a situation where the distributed compression service is automatically triggered by the storage operating system as a background job, as previously described, the compression should be carried out without substantially affecting foreground jobs. A distributed compression algorithm should thus be flexible enough to support different workloads without substantially affecting the overall compression efficiency or its reliability. For example, it should accept different chunk sizes as input, or even enable pre-emption without breaking the consistency of the compressed bit streams.

Chunk-Based, Distributed Compression and Decompression

As previously indicated, the disclosed techniques are based on the compression and decompression of file chunks. It can be shown that chunks can be processed by compute nodes in a quasi-shared-nothing manner, meaning that very little information needs to be passed between the compute nodes. In this way, the parallelization capabilities of the compression algorithms are substantially maximized.

Preliminaries

A seismic data chunk is an abstraction for accessing a subset of a seismic file containing trace headers and trace data. A seismic file F can be subdivided into N chunks $C_i(s_i, e_i)$, $i \in [0, N-1]$, where $s_i$ and $e_i$ are, respectively, the start logical offset in bytes of the chunk and its end offset, relative to the beginning of the file. The offsets are defined such that no restriction on their sizes is imposed, provided that $s_i \le e_i$ and $e_i < s_{i+1}$.

It is desirable that the compression ratios obtained with the exemplary content-aware lossless compression algorithms applied to the individual file chunks are not degraded when compared to the compression of the entire file. The question is thus how the exemplary content-aware lossless compression algorithms behave in such a distributed implementation. For the Minimal-Length compression, it must be checked whether small chunks have different {exponent, length} statistics that increase bookkeeping to a point at which compression ratios are worsened. With the Alignment compression, file subdivisions clearly break run-length sequences and also increase the chances of replicating symbols appearing across the chunk-by-chunk dictionaries.

It can be shown that the accumulated size of the compressed chunks, $\hat{M}$, is comparable with the size of the complete compressed file, M, meaning that dividing large seismic files into chunks and compressing them individually will not deteriorate the overall compression ratios obtained with the Minimal-Length and the Alignment compression algorithms. Experimental results have shown that the overall difference in compression ratios is negligible. Results were similar for the Turbo and Max versions of the compression algorithms and confirmed that spreading file segments across a distributed computing environment and processing them individually will most probably not degrade compression ratios.

Compression Descriptor

Content-aware, seismic data compression as implemented by the exemplary Minimal-Length and the Alignment compression algorithms can only be done after some information about the data is obtained. Such information is important for inferring the content of a given chunk at compression or decompression time. In other words, the number of traces, the number of samples per trace, and the sample data type must either be read or inferred from the SEG-Y headers. The results from the data analysis step 140 in FIG. 1 are also important for the correct parameterization of the exemplary compression algorithms, as well as for the efficient, distributed, content-aware compression of SEG-Y headers, as will be described hereinafter.

In order to allow the independent compression and decompression of individual file chunks across multiple compute nodes, a compression descriptor is created to persist the relevant information to be passed to different compute nodes. FIG. 6 illustrates an exemplary compression descriptor 600. As shown in FIG. 6, the exemplary compression descriptor 600 comprises three main sections. A first section 610 holds basic file information obtained from the SEG-Y headers, such as the number of samples per trace and the sample data type. A second section 620 holds statistics gathered from the samples and the choice of compression algorithm deriving from it. Such information is also useful for the parameterization of the compression algorithm itself. Finally, a third section 630 keeps data associated with statistics about the SEG-Y headers, which is used to compress them. As discussed further below in conjunction with FIG. 7, the exemplary compression descriptor 600 is generated as part of an initialization phase.

Compression and Decompression Workflow

Figures 6, 7:
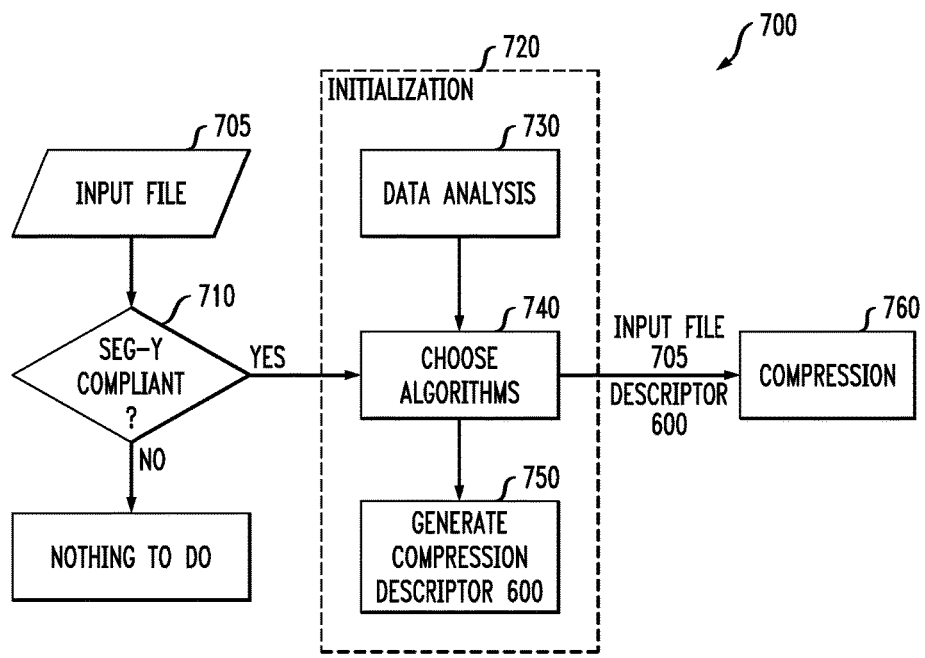
FIG. 6 illustrates an exemplary compression descriptor incorporating aspects of the invention.
FIG. 7 is a flow chart illustrating an exemplary compression workflow according to one embodiment of the invention.

FIG. 7 is a flow chart illustrating an exemplary compression workflow 700 according to one embodiment of the invention. As shown in FIG. 7, the exemplary compression workflow 700 starts with an initialization step 720 that receives an input file 705, comprised, for example, of a seismic data file. A test is performed during step 710 to ensure that the exemplary seismic data file 705 is compliant with the SEG-Y standard.

The initialization step 720 can be carried out by any node in the distributed computing infrastructure, provided that such node has access to a large enough section of the input file 705 (e.g., a statistically significant portion). The evaluated section must contain all text and binary headers, plus a statistically significant collection of trace headers and respective seismic samples. The evaluated section will be used in three processes: 1) the analysis of seismic samples and trace headers during step 730; 2) based on the data analysis process in step 730, the choice of the compression algorithm to be used on the samples and the parameters for the content-aware compression of trace headers during step 740; and 3) the creation of the compression descriptor 600 (FIG. 6) during step 750 with the relevant information.

The input file 705 and generated compression descriptor 600 are then employed during a compression step 760, as discussed further below in conjunction with FIG. 8.

FIG. 8 is a flow chart illustrating an exemplary implementation of the compression step 760 of FIG. 7 in further detail. A compute node executing the compression 760 receives as input a file chunk 810, the start offset 820 of file chunk 810, and the descriptor 600 created in the initialization phase 720 (FIG. 7). It is assumed that the file subdivision itself and the association between chunks 810 and their offsets 820 are managed by a controlling agent present in the distributed infrastructure, for example its operating system, as discussed further below in conjunction with FIG. 16 and the section entitled "Compression Management."

As shown in FIG. 8, the compression 760 splits the data inside the chunk 810 into headers 850 and samples 860 during step 840. Note that the splitting 840 must know whether the chunk 810 contains headers 850 and (or) samples 860, and which portions thereof. Since SEG-Y files have headers of fixed, pre-determined sizes, the provided chunk offset 820 and the basic information present in the descriptor 600 are sufficient to infer the contents of the chunk 810, making the splitting 840 a straightforward operation in the exemplary embodiment.

Next, the collection of headers 850 within the chunk 810 and the collection of samples 860 within the chunk 810 are provided to the respective compression modules 855, 865, which will be detailed in the following sections. Finally, compressed headers and samples are packed together during step 870 into a single bit stream, which makes up the compressed version of the input chunk 810.

Provided that the compression algorithms running in a compute node receive as an argument the offset 820 of the chunk 810 to be processed relative to the beginning of the file 705 and metadata indicating how the chunk should read and processed, chunks 810 might be file segments, storage blocks, or even plain sequences of bytes stored in RAM. This represents unprecedented flexibility in the implementation of a distributed, content-aware, lossless seismic data compression algorithm.

FIG. 9 is a flow chart illustrating an exemplary implementation of a decompression workflow 900. The exemplary decompression workflow 900 is basically the inverse of the compression workflow 760 (FIG. 8). As shown in FIG. 9, the exemplary decompression workflow 900 receives as input a compressed chunk 910, the associated offset 820 of its uncompressed version, and the same compression descriptor 600 used in the compression phase. It is assumed that the controlling agent present in the distributed infrastructure creates associations between compressed chunks 910 and the offsets 820 of their uncompressed versions. The compressed chunk 910 is a combination of compressed data samples 960 and compressed headers 950. With the given offset 820 and the basic information in the descriptor 600, the unpacking step 940 infers whether the chunk contains headers 950 and (or) samples 960 and which portions thereof. The compressed headers 950 and compressed samples 960 are provided to the respective decompression step 955, 965. The decompression workflow 900 finishes with the merging of uncompressed headers and samples in their original order during step 970.

Compression and Decompression of SEG-Y Headers

The compression of headers during step 855 (FIG. 8) is subdivided into two main tasks:

1. Compression of textual headers 410, 430 and binary headers 420 (FIG. 4).
2. Compression of trace headers 440 (as discussed further below in conjunction with FIGS. 11A and 11B).

Since the exemplary distributed compression is chunk-based, it is assumed that the first chunk of the file will necessarily contain all the initial textual headers 410, 430 and binary headers 420. Therefore, when the first chunk of the file is compressed by one of the compute nodes, the headers 410, 420, 430 will be extracted and compressed with a standard entropy encoder, and the result will be stored along with the other compressed chunk data.

For the compression of trace headers 440, a content-aware approach is employed. It has been observed that most of the values present in the trace header fields 440 tend to follow regular linear patterns, as a function of the trace header index. The exemplary compression strategy for the trace headers 440 exploits these global field-by-field patterns in order to maximize the compression of trace fields locally within SEG-Y chunks.

FIG. 10 illustrates exemplary pseudo code 1000 for step 740 of the initialization 720 (FIG. 7) for the compression of trace headers 440. Given a SEG-Y file, T trace headers 440 are read in the initialization phase 720 of the compression algorithm 700. For each trace, the values of their fields are loaded. For each field, j, a linear regression is applied in code section 1010 in order to find the line, $f_j(x)=a_jx+b_j$, that best fits the T field values, $f_j(x_t)$, as a function of the trace header index, $x_t$, $0 \le t \le T-1$. The coefficients, $(a_j, b_j)$, associated with the line for each field are then stored in the compression descriptor 750 in code section 1020.

Because the global patterns are usually regular, the linear regression in code section 1010 tends to yield a line that almost perfectly fits the data. The net effect is that the field values estimated by the computed line are almost always exactly the value stored in the SEG-Y file. In order to further optimize the "local" compression of trace headers 440 present in file chunks, a "Global Zero" (GZ) table is defined in code section 1030 as a bitmap to indicate for which fields the linear regression was exact or not. Namely, the global zero bitmap contains a binary zero where the regression was exact and a binary one otherwise. Once the global zero bitmap is computed, the global zero bitmap is stored alongside the line coefficients in the compression descriptor 600.

When the distributed compression starts, each compute node infers from the start offset of the chunks they receive whether the chunks contain trace headers 440. If the received chunks do contain trace headers 440, the compute node then determines the indices of the trace headers 440 in the file and which portions of the headers 440 are present in the chunk (note that a trace header 440 may have been split during the file subdivision process). Next, for each trace header 440 in the chunk, the value of each of its fields will be predicted via the coefficients of the line that was fit to the field values at the initialization step 720, as discussed above in conjunction with FIG. 10, using the trace header index as input. An error (or residual), $e_j=\hat{f}_j(x)-f_j(x)$, will be computed for each field, where $\hat{f}_j(x)=a_jx+b_j$, is the estimated (or predicted) value of field j of the trace header with index x, and $f_j(x)$ is the field's true value as read from the file chunk.

FIGS. 11A and 11B, collectively, illustrate exemplary pseudo code 1100 for the compression of trace headers 440 present in file chunks. As shown in FIG. 11A, a code section 1110 infers the trace index from the offset for each header field, a code section 1120 predicts the field value with the line function computed using the pseudo code 1000 of FIG. 10, a code section 1130 computes the error in the prediction and a code section 1140 stores the residual.

With the assumption that the linear patterns are regular across the entire file (as derived from experimental observations), it is reasonable to expect that the residuals $e_j$ will be zero in the majority of cases. A "Local Zero" (LZ) table is thus defined in code section 1150 as a bitmap to indicate for which fields of a trace header in a file chunk the prediction was exact, similar in nature to the global zero (GZ) table defined previously in conjunction with FIG. 10.

The GZ table indeed represents a prediction of which field values within the entire SEG-Y file are most likely to be exactly estimated via a linear function of the trace header index. The idea, then, is to inform the compressor about only those fields (or bits) in the LZ table that did not match their counterparts in the GZ table, along with the residuals that differed from zero. By doing this, the amount of data to be compressed on a chunk-by-chunk basis is largely reduced.

A difference zero value is computed in code section 1160 as the difference from the LZ table to the GZ table. A local difference value is computed in code section 1170 based on the list of indices of fields that did not match the GZ prediction. A code section 1180 compresses the list of header field indices for which the values in the corresponding positions of the LZ and GZ tables were different, specified by the "local_differences" list, along with the corresponding residuals that differed from zero. The "local_differences" in code section 1180 allow the invoked compression step to infer which the residuals in "residual_list" should be compressed.

FIG. 12 is a sample table 1200 that stores the global zero (GZ) and local zero (LZ) values computed by the exemplary pseudo code 1100 for the local compression of trace headers 440. The upper table 1210 shows the n trace fields (TF) to be compressed, the Global Zero table (GZ) read from the compression descriptor, and the Local Zero table of the $i^{th}$ trace header in a chunk ($LZ_i$). The $i^{th}$ Difference Zero table ($DZ_i$) indicates which bits of $LZ_i$ (or fields of the trace header) did not match the prediction set by GZ. The lower table 1220 stores the local_differences$_i$ list containing the number of bits in $DZ_i$ that are set, followed by their indices; and the residual_list$_i$ holds the residuals for which the local prediction was not exact (derived from $LZ_i$). In the end, the values in local_differences$_i$ and in the residual_list$_i$ will be passed to the compressor. Note that although $DZ_{i3}=1$, the local prediction was in reality exact, that is, $LZ_{i3}=0$ and $e_3=0$. Consequently, $e_3$ does not need to be compressed and does not appear in the residual_list$_i$. The same applies to field n-2.

The values given to the compressor, that is, the local_differences and residual_list shown in the exemplary pseudo code 1100 for the local compression of trace headers 440 and in Table 1200 (FIG. 12), are compressed using an exemplary adaptive Elias Gama entropy encoder. See, e.g., P. Elias, "Universal Codeword Sets and Representation of the Integers," *IEEE Trans. on Information Theory*, Vol. 21, No. 2, 194-203 (1975). The Elias Gama encoder is suited for geometric probability distributions of the form $P(x)=(1-p)^{(x-1)}p$. Such distributions indicate that small values of x (i.e., needing fewer bits to be represented) occur much more frequently than large ones. The encoder transforms input numbers into codes of variable length, by fitting them into bins whose sizes are increasing powers of 2, that is, 1 2 4 8 16 32 64 etc. A number N to be encoded is calculated as $N=2^{bin\_index}+(N \text{ modulo } 2^{bin\_index})$ and is thus represented by the bin-index in unary form (a sequence of bin-index 0s followed by 1) followed by the binary form of the result of the modulo operation, which by definition requires bin-index bits to be represented. Following this scheme, the algorithm will encode the most frequent numbers with very few bits.

Aspects of the present invention adapt the Elias Gama algorithm to distributions that do not exactly follow a geometric probability distribution, but still have small numbers occurring much more frequently than large numbers (assuming this will be achieved with the linear and zero predictions described above). In the same way as employed by the content-aware lossless compression algorithms, the idea is on the one hand to increase the inferior limit of the encoding bins, so that they start at the point at which the data seems to more closely fit a geometric distribution. The encoding table can be derived from a statistical analysis of the headers executed during the compression initialization and stored in the compression descriptor.

FIG. 13 illustrates an exemplary byte encoding table 1300 for trace header fields. As shown in FIG. 13, the exemplary byte encoding table 1300 indicates a prefix, sign and code for various ranges of residuals of the prediction for trace header values.

Figure 14:
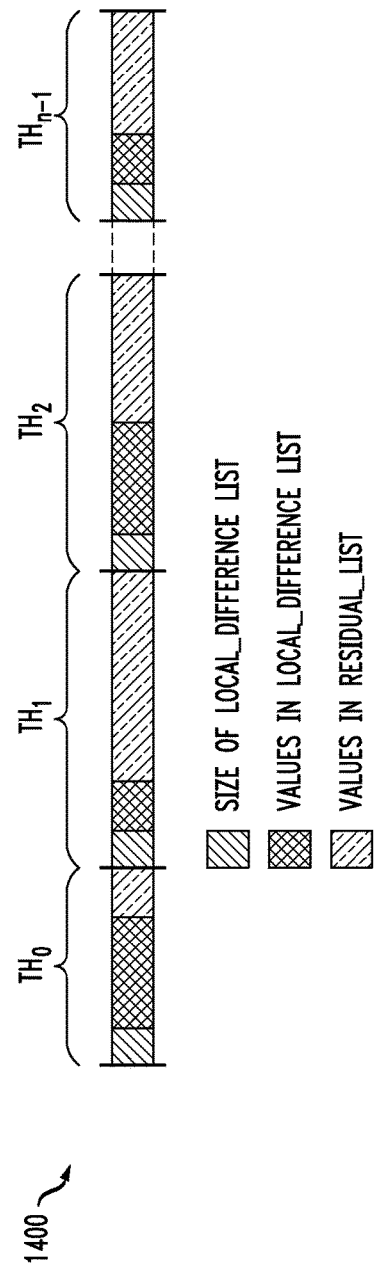
FIG. 14 illustrates an exemplary layout of compressed trace headers.

FIG. 14 illustrates an exemplary layout 1400 of compressed trace headers (TH). As shown in FIG. 14, for each trace header (TH), the layout 1400 indicates the size of the local_differences list, the values in the local_differences list and the values in the residual_list. In the end, the collection of trace headers in a SEG-Y chunk will be packed in compressed form as shown in FIG. 14, and stored at the beginning of the compressed stream of the chunk.

The decompression follows the reverse path of compression. Namely, given the compressed bit stream of a certain chunk 910 (FIG. 9), the compression descriptor 600, and the offset 820 of the chunk relative to the original file, the decompressor 900 infers whether the compressed chunk 910 contains traces, and which portions of them. First, the decompression algorithm 900 decodes the local_differences and residual_list tables 1220 (FIG. 12) using the encoding table 1200 stored in the compression descriptor 600. Next, the GZ table (part of 1210) is read from the descriptor 600 and, with the decoded local_differences, the LZ table (part of 1210) of each trace header (TH) is rebuilt. With the LZ table, it is possible to know which residual from the residual_list applies to which trace header field. The decompression algorithm 900 reads the line coefficients from the descriptor 600, estimates the field values using the associated line equations and sums the residuals wherever necessary. The decompressed trace headers are then merged with the related decompressed samples during step 970 to obtain the decompressed chunk.

Compression and Decompression of Seismic Samples
Compression (Turbo Versions)

Once headers and samples are split into separate streams, the samples are provided as input to either the Minimal-Length or the Alignment compression algorithm, in the same way as described above and illustrated in FIG. 1, depending on the algorithm type specified in the compression descriptor. The main difference here is that the chosen algorithm will be executed on the chunk only. This means that the {exponent, length} statistics for the Minimal-Length compression or the fraction dictionaries for the Alignment compression will be created based only on the data contained in the chunk. For the Turbo versions of the algorithms, there is no conceptual change.

Compression (Max Versions)

For the Max versions, however, it is worth noting that the linear prediction is carried out on a trace-by-trace basis. Since there is no guarantee that a file chunk will always have complete traces, there are two possible compression strategies to be implemented:

1) Interpret the entire sequence of samples present in the chunk as a single trace;
2) Using the information present in the descriptor 830 (FIG. 8), find trace borders and reset the predictor at the start of each trace.

Strategy (1) is a more simple strategy, but tends to yield slightly worse results. With strategy (2), the start of the first trace or the end of the last one (or both) might not be present in the chunk. Although this may degrade the quality of the prediction in those regions, experiments have shown that the overall compression ratios barely change. What is worth stressing is that, irrespective of the strategy employed for the linear prediction, the proposed techniques for the distributed compression remain conceptually unaffected.

Additionally, as shown in FIG. 2, the Max version of the Minimal-Length compression algorithm applies a standard entropy encoder to the output of the classified residuals of the linear prediction. This extra encoding step is particularly effective in the compression of the class codes associated with the {exponent, length} pairs, which are written to the bit stream generated by the compression algorithm. In this way, a Huffman tree (D. Huffman, "A Method for the Construction of Minimum-Redundancy Codes," *Proceedings of the IRE* (1952) is obtained directly from the {exponent, length} statistics in order to replace the (fixed-length) class codes with variable-length codes derived from the Huffman tree. Such a tree is stored along with the compressed seismic samples, which are then packed with headers in a single bit stream, yielding a structure as depicted in FIG. 15.

Figure 15:
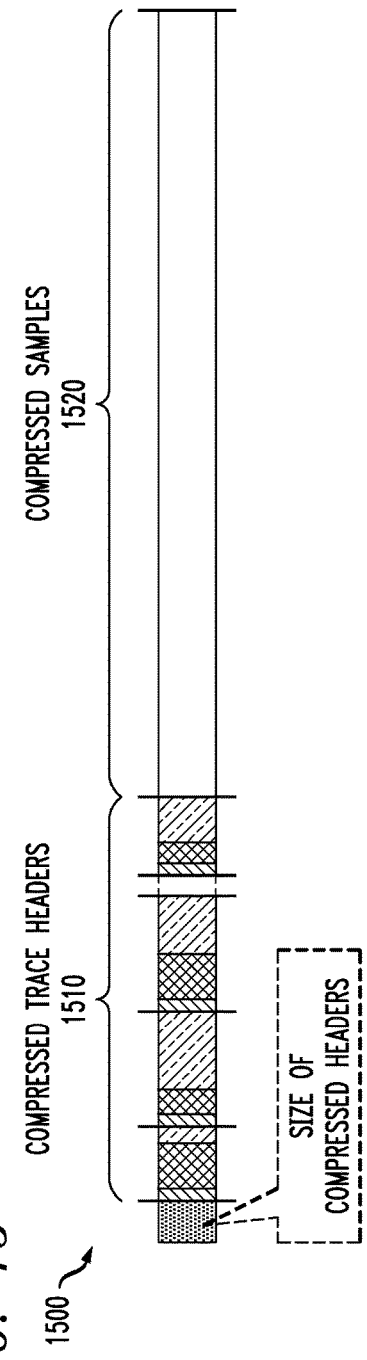
FIG. 15 illustrates an exemplary structure of a compressed chunk.

FIG. 15 illustrates an exemplary structure of a compressed chunk 1500. As shown in FIG. 15, the structure 1500 comprises compressed trace headers 1510 and compressed samples 1520. If the chunk being compressed contains the textual and binary headers (that is, the initial bytes of the file) the compressed headers 1510 are stored at the beginning of the compressed bit stream 1520 of the compressed chunk 1500. A field also indicates the size of compressed headers.

Decompression

Sample decompression reverses the steps used in the compression. If the Max Version was chosen, Huffman codes are converted back into class codes. Additionally, prediction is employed and the decompressed residuals are used to obtain the original samples. While being decompressed, samples and headers are merged together so as to restore the original chunk.

Compression Management

In one or more exemplary embodiments, the disclosed distributed content-aware lossless compression algorithms are agnostic with respect to the file system level or distributed infrastructure in which the disclosed techniques are implemented. A controller is assumed within the operating system of the distributed environment, which will be responsible for coordinating the work of the distributed compression.

Figure 16:
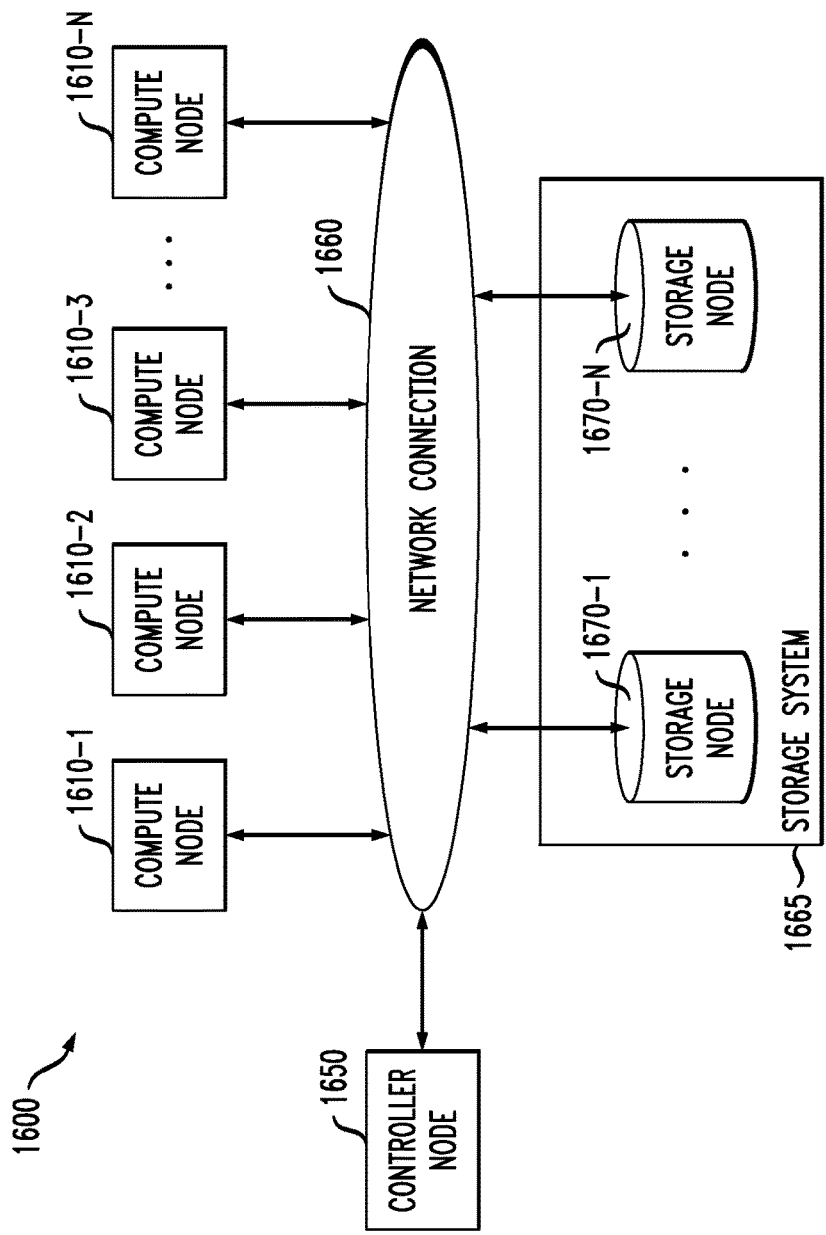
FIG. 16 illustrates an exemplary network environment in which the present invention can operate.

FIG. 16 illustrates an exemplary parallel computing environment 1600 in which the present invention can operate. The exemplary parallel computing environment 1600 comprises a plurality of compute nodes 1610-1 through 1610-N (collectively, compute nodes 1610). The compute nodes 1610 optionally store data in one or more storage nodes 1670-1 through 1670-N of an exemplary storage system 1665 accessed over one or more network connections 1660. The storage nodes 1670 may comprise, for example, flash based storage nodes and/or disk-based storage nodes, or a combination thereof.

In addition, a controller node 1650 coordinates the work of the distributed compression. It is noted that the controller node 1650 can be a distinct node, as shown in FIG. 16, or one or more of the compute nodes 1610 and storage nodes 1670 can serve as the controller node 1650.

As noted above, the disclosed distributed content-aware lossless compression algorithms are agnostic with respect to the underlying storage and computing infrastructures in the exemplary parallel computing environment 1600 while being scalable. The disclosed distributed content-aware lossless compression algorithms can be implemented, for example, in one or more of the compute nodes 1610 and/or storage nodes 1670 having computational capacity, as discussed further below. For example, the exemplary distributed content-aware lossless compression algorithms can be implemented on several cores of the same central processing unit (CPU) accessing local storage, several compute nodes 1610 of a high performance computing (HPC) cluster attached to a storage area network (SAN) (such as storage system 1665), or, ideally, embedded in the storage nodes 1670 of a distributed, scale-out, network attached storage (NAS), as would be apparent to a person of ordinary skill in the art based on the present disclosure. In this manner, the exemplary distributed content-aware lossless compression algorithms can be implemented in a file system and/or one or more compute nodes of a computing cluster, as discussed in the following sections.

The overall responsibilities of the controller 1650 comprise:
1) Start a compression or decompression job;
2) Locate and dispatch chunks to be compressed or decompressed in the compute nodes;
3) Control and index the chunks of the file that have already been compressed, releasing the space occupied by the corresponding original data
4) Receive and interpret access requests to compressed data;
5) Manage compressed and uncompressed parts of the same file in order to answer requests; and
6) Manage compression services running as background jobs.

Embedded Computing Within Distributed File Systems

As noted above, in one or more exemplary embodiments, the disclosed distributed content-aware lossless compression algorithms are implemented using the computational capacity of a plurality of storage nodes in a file system. In a distributed file system, such as SAN (storage area network) and (scale-out) NAS (network attached storage), a large storage area is built-up through the virtual amalgamation of several smaller, often dispersed, storage units. For a more detailed discussion of exemplary storage systems, see, for example, Richard Barker and Paul Massiglia, Storage Area Network Essentials: A Complete Guide to Understanding and Implementing SANs (2002, John Wiley & Sons); and Anton Dave, "Understanding Enterprise NAS," Storage Networking Industry Association (2012), each incorporated by reference herein. In this context, large files are usually broken into pieces and spread across the storage units, for increased I/O performance (through parallelism) and security (through replication).

In SANs, for example, files are usually managed by an external operating system that directly manipulates file blocks of fixed size associated with the physical layers of the storage. NASs, on the other hand, have their own operating systems, which allow external clients to interact directly with the files stored therein. The operating systems of NASs, however, manipulate blocks as well.

In the context of the present invention, files represent a "logical" view of the storage contents, whereas blocks are associated with its "physical" layer. It can be shown that one or more embodiments of the distributed compression and decompression methods disclosed herein can be implemented at the logical level and/or physical level of a distributed file system, while still providing transparent access to the compressed data. As noted above, various embodiments of the disclosed distributed compression and decompression methods are agnostic with respect to whether the algorithms are implemented in the logical level or physical level of a distributed file system.

Compression at Logical (File) Level

At the logical level, the file system provides a holistic view of the files it manages. Clients of the storage system usually have access to a global namespace where all files are stored. If the disclosed content-aware lossless compression is implemented at this logical level, each storage node 1670 will also have a view of the entire files. The job of the controller 1650 will be to fetch a section of the input file (a chunk, as defined herein) and provide it to the compression instances running in the storage nodes, along with its associated offset and the compression descriptor related to the file being compressed.

Figure 17:
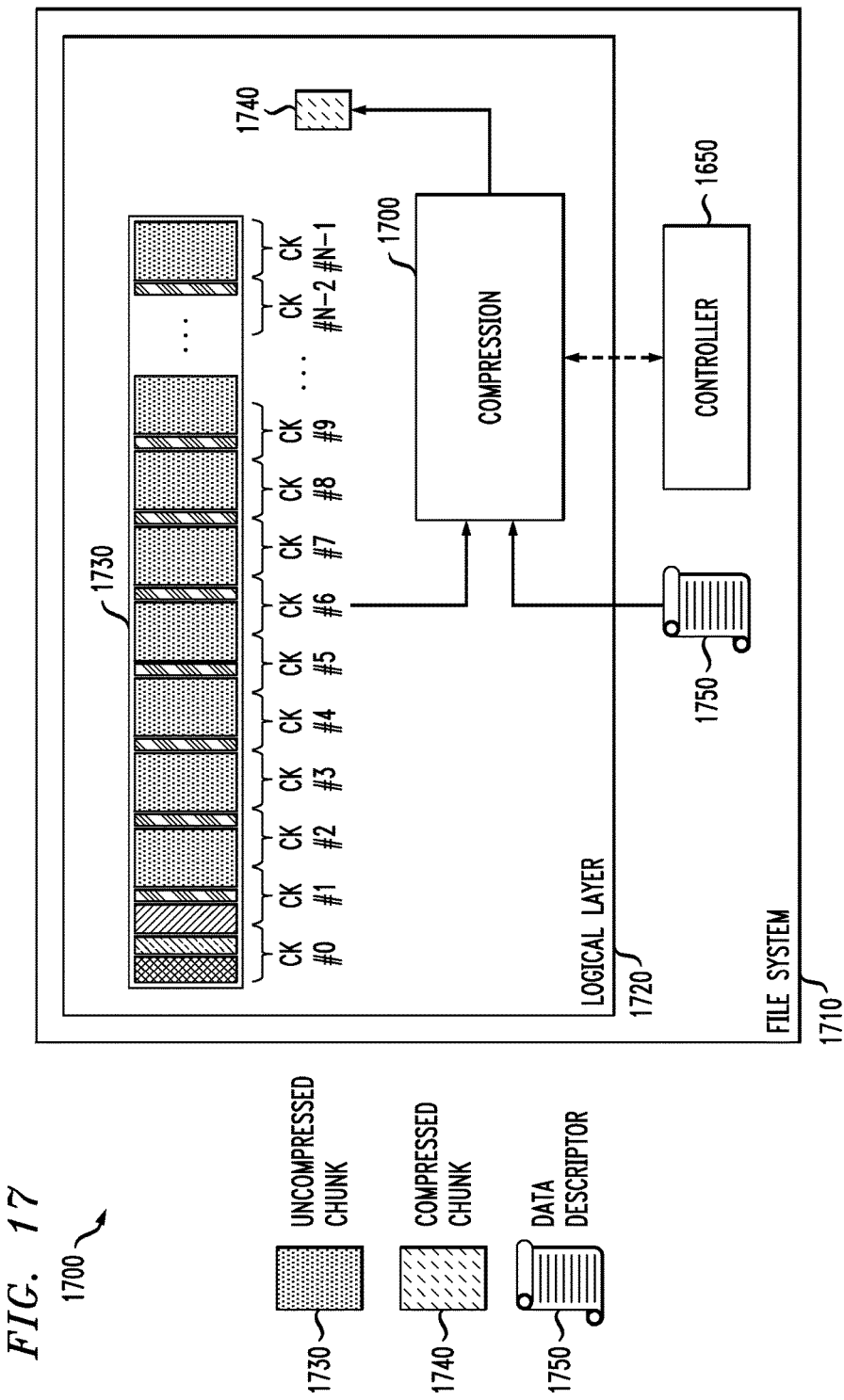

FIG. 17 illustrates a compression process 1700 operating at a logical layer 1720 of a file system 1710. As shown in FIG. 17, the controller 1650 fetches file chunks from the file system 1710 and dispatches them to the compression jobs running in the storage nodes. Decompression is analogous to the compression. As shown in FIG. 17, one or more uncompressed chunks 1730 are applied to the compression process 1700 with the associated data descriptor 1750 to obtain the compressed chunks 1740, under the control of the controller 1650.

In the scenario of FIG. 17, CPU usage will be constrained to the storage node 1670 running the compression, but each logical file chunk 1730 may contain data that are physically stored in different nodes. In the same way, compressed chunks 1740 may be persisted across more than one storage node 1670, which may be different from the node that carried out the compression itself. This gives to the controller 1650 the flexibility to manage computing resources, since data residing in one or more storage nodes 1670 can easily be dispatched to idle compute nodes 1610, especially when using high bandwidth standards such as InfiniBand™. See, for example, "InfiniBand™ Architecture Specification, Volume 1", InfiniBand$^{SM}$ Trade Association (2015). Still, regardless of the way in which data is retrieved or persisted, the compression workflows discussed above in conjunction with FIGS. 7-15 are substantially unaffected.

Compression at Physical Level

Compression and decompression done at the physical level are similar to the way they are done at the logical level. The blocks represent sequences of bytes that can be interpreted as file chunks. Each block is naturally associated with an offset within the file. As a result, each compression or decompression instance needs only the block to be compressed or decompressed, its associated offset, and the compression descriptor FIG. 18 illustrates a compression process 1800 at a physical layer 1820 of a file system 1810. A file is, by construction, a collection of blocks spread throughout the physical layer of the storage system. It is a responsibility of the controller 1650 to provide blocks to the compression jobs running in each storage node 1670. Decompression is analogous to the compression. As shown in FIG. 18, one or more uncompressed blocks 1830 are applied to the compression process 1800 with the associated data descriptor 1850 to obtain the compressed blocks 1840, under the control of the controller 1650.

Conceptually, when applied at the physical layer 1820, the compression and decompression workflows discussed above in conjunction with FIGS. 7-15 are substantially unaffected.

One potential advantage of implementing the distributed compression at the physical level 1820 in the manner shown in FIG. 18 is to exploit data locality. Since every file is distributed across the storage nodes 1670, the file system 1810 has control over which file blocks are stored in each storage node 1670. Consequently, a compression instance running in a particular node 1670 could process only the blocks stored therein. This tends to largely increase data independency, parallelism capabilities, and even mirroring efficiency, since less data (i.e., compressed blocks 1840) would be replicated across the storage architecture.

Transparent Access to Compressed and Uncompressed Portions of Same Seismic Data File As described above in the section entitled "Access to Partially Compressed Files," when embedding compression in the file system 1710, 1810, it is desirable to provide a service in which clients interact with compressed seismic files as if they were directly accessing the uncompressed data. In effect, this service is widely available in modern operating systems. See, for example, A. S. Tanenbaum, Modern Operating Systems, Prentice Hall, 2001. One or more exemplary embodiments of the invention can be integrated with such a service.

For a more detailed discussion of transparent access to compressed data, see, for example, U.S. patent application Ser. No. 14/749,826, filed Jun. 25, 2015, entitled "Random Access to Compressed Data Using Bitwise Indices," incorporated by reference herein above.

In one or more exemplary embodiments, the file system 1710, 1810 maintains a table that indicates which parts (either chunks 1730 or blocks 1830) of the original file 705 correspond to which parts of the compressed data 1740, 1840.

If the compression is carried out by background jobs, the table 1200 is updated dynamically. When the compression of one chunk 1730 or block 1840 ends, the original chunk or block of the file is replaced by its compressed version 1740, 1840, and the respective entry in the table 1200 is updated. If a client requests access to a certain range of bytes of the original file 705 (not knowing whether it has been compressed in the background), the file system 1710, 1810 checks the table 1900 to know whether the corresponding file chunks 1730 or blocks 1830 are compressed. Those file chunks 1730 or blocks 1830 that have not yet been compressed will be promptly returned to the client "as-is". Those file chunks 1730 or blocks 1830 that have been compressed, in turn, will be provided to the decompression job, along with their associated offsets 820 and compression descriptors 600. Note that several blocks 1840 or chunks 1740 can be decompressed in parallel. Once decompressed, the restored blocks or chunks are merged together with those that were not compressed and returned to the client. As discussed above, this approach incurs substantially no conceptual changes to the compression workflow 800 (FIG. 8) and decompression workflow 900 (FIG. 9), since the file system 1710, 1810 and respective controllers 1600 have full control over chunks 1730 (or blocks 1830), offsets 820 and compression descriptors 600.

Compression and Decompression Using Computing Clusters

As noted above, in one or more exemplary embodiments, the disclosed distributed content-aware lossless compression algorithms are implemented using compute nodes within one or more computing clusters. As discussed above in conjunction with FIG. 16, in a typical configuration of computing clusters (e.g., HPC environments), the compute nodes 1610 access a large, centralized storage system 1665, where the data to be processed resides. For the proposed compression and decompression methods to work in such environments, the controller 1650 communicates with the compute nodes 1610 to determine which nodes would be responsible for compressing which parts of a file located in the centralized storage system 1665. The controller 1650 itself could run the initialization step 720, generating the compression descriptor 600 and, for example, replicating the compression descriptor 600 to all nodes. Each node 1610 could then open the file, retrieve the chunks determined by the controller 1650 and compress them individually, storing the compressed versions back in the storage system 1665. Such approach largely benefits from the inherent parallel I/O access to the files to be compressed, and, since each chunk is associated with an offset, the compression workflow would, again, be executed without conceptual changes.

Naturally, some level of communication between the compute nodes 1610 and the controller 1650 would be necessary so as to create maps or metadata that would enable the correct decompression of the file chunks and the restoration of the original file. Transparent access to the compressed data could also be provided through the implementation of special APIs that would be used by client applications. Apart from that, the decompression workflow would, in principle, be unaffected as well.

Among other benefits, the disclosed distributed, content-aware compression algorithms provide access to compressed file portions, and also allows such access to be done in a massively-parallel manner. Such features are not found in the context of content-aware seismic data compression. In this manner, aspects of the invention provide transparent access to compressed and uncompressed portions of the same seismic data file.

Examples

The disclosed distributed content-aware lossless compression techniques can be employed for the compression and decompression executed on a distributed NAS system. The example is a use case where a given folder in the NAS system is marked to be liable to compression by the user. The files in this folder are SEG-Y files that will be compressed and decompressed on demand by the NAS system using the methods and algorithms described in this invention.

The disclosed distributed content-aware lossless compression techniques can also be employed in an HPC environment, where different compute nodes may access different chunks of a single SEG-Y file independently and at the same time. The decompression in this scenario may be massively parallel, improving the performance of one or more end-user software connected to a centralized storage delivered by the HPC.

Compression and Decompression of Large Files Stored on a Distributed NAS System

The compression of one SEG-Y file occurs in two sequential steps. The first step is called the compression initialization step 720 and it is executed by the master compute node (e.g., controller 1650) (or any compute node with reading access to the first chunk of the file and writing access to a global namespace). This initialization step 720 performs the extraction and compression of the initial headers 410, 420; it also performs the analysis of trace headers 440 and data samples 450, and creates the compression descriptor 600. A chunk size of 128 KB at the beginning of the file is generally enough to read the initial headers 410, 420 and several initial traces 450.

The extracted initial headers are the textual headers 410 and binary headers 420, and the compression technique used on them is a standard entropy encoder. Part of the information contained within the initial headers 410, 420 is written to the compression descriptor 600, namely: the type and size in bytes of a seismic data sample in a trace; the offset in bytes to the first trace; the size in bytes of a seismic data trace; and the number of traces contained in the file. The analysis of several initial traces is composed of a number of statistical computations important to define and specify the compression algorithm, for both trace headers and data, used on all chunks of the entire file to be compressed in the second step. The result of this analysis is written to the compression descriptor 600, and the first step 720 finalizes.

The second step is called the distributed compression step 760 and it is executed by one or more compute nodes of the distributed NAS system. A compute node receives a chunk of the file 705 to compress independently to the other compute nodes, and has access only to a global namespace storing the compression descriptor 600 created in the first step 720. Compression step 760 performs the split of an input chunk 810 into separate headers 850 and data 860, as discussed above in conjunction with FIG. 8. Compression step 760 compresses headers 850 during step 855 using a prediction-based algorithm and samples using either the Minimal-Length or Alignment compression algorithms, as discussed above in conjunction with FIGS. 2 and 3, respectively. The split of the input chunk 810 is performed in the byte sequence, using information from the initial headers stored in the compression descriptor, where a single chunk 810 can have multiple headers and data, including parts of each. The compression of headers 850 and data 860 follows the algorithms described in previous sections.

The decompression 900 of any chunk of a SEG-Y file is executed by one compute node per compressed chunk 910, as discussed above in conjunction with FIG. 9. The decompression 900 can generally occur in parallel on the distributed NAS system, since each compute node runs the decompression independently of the other nodes. A compute node receives the byte offset 820 relative to the original, uncompressed chunk and the sequence of bits corresponding to the chunk requested to be decompressed, and has access only to the global namespace storing the compression descriptor created by the first step of the compression. In the case of the seismic data samples, the information contained within this sequence of bits is sufficient to decode the sequence itself—the chunk is compressed as if it were a single file. In the case of the seismic trace headers, the information from the compression descriptor is used together with the sequence of bits itself in order to decode the header bits. After both headers and data are decompressed, the last task is to join them back as a full sequence of bytes exactly equal to the original chunk of the SEG-Y file. The compression descriptor is read in this last task to organize the decompressed sequences within the chunk. The result returned by the compute node is the decompressed chunk of the SEG-Y file.

Massively-Parallel Access to Compressed Data in an HPC Environment

In seismic processing algorithms, traces are usually processed in groups (gathers). In the Reverse Time Migration (RTM), for example, traces originated from the same acoustic shot are processed together. In general, these traces are laid out sequentially in the corresponding SEG-Y file. If the file is compressed by chunks with the method of this invention, the traces are also laid out sequentially in the chunk's compressed bit stream. If the RTM algorithm is interacting directly with the compressed file, the traces may be retrieved on demand via the proposed chunk-based decompression. In this way, they may be found and read very efficiently, without impacting the overall performance of the algorithm. In fact, the performance could even be improved, given that access to disk will be reduced because less (i.e., compressed) data will be read.

Since seismic processing applications are usually executed in a distributed, HPC environment, the different compute nodes can access different chunks of the compressed data transparently. A cache and pre-fetching mechanism may even improve the per-node access to the file if the traces, which are candidates to be processed by the end-user software in the next iterations, were retrieved ahead of their use and written in the node's cache. All this without having to regenerate the original file from its compressed version.

CONCLUSION

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 19:
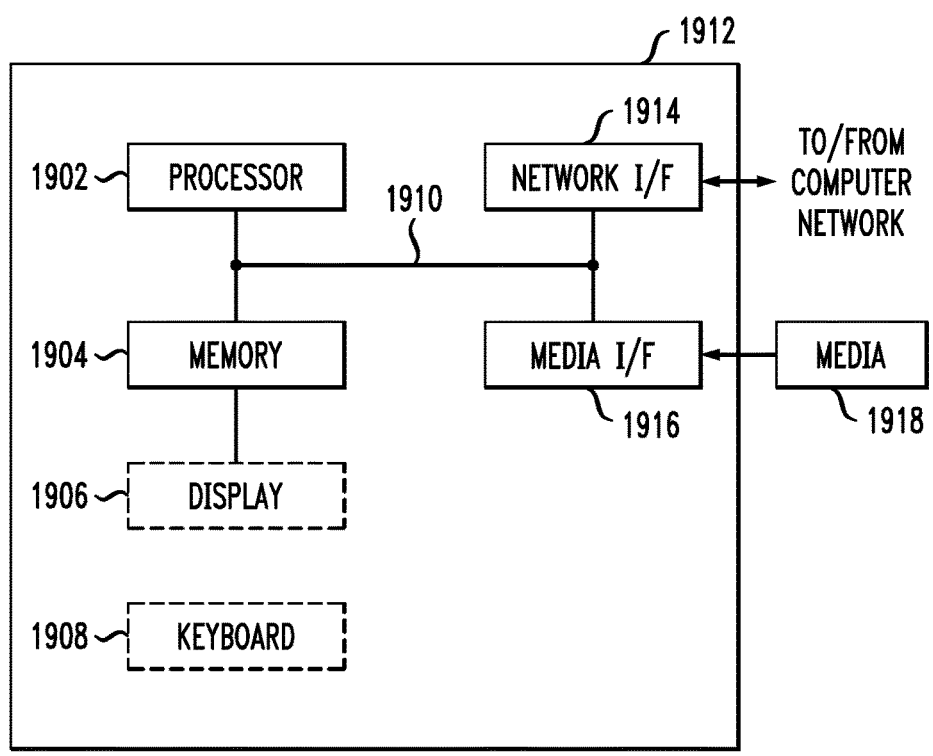
FIG. 19 is a system diagram of an exemplary computer system on which at least one embodiment of the invention can be implemented.

By way of example, an aspect of the present invention can make use of software running on a general purpose computer. FIG. 19 is a system diagram of an exemplary computer system on which at least one embodiment of the invention can be implemented. As depicted in FIG. 19, an example implementation employs, for example, a processor 1902, a memory 1904, and an input/output interface formed, for example, by a display 1906 and a keyboard 1908. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1902, memory 1904, and input/output interface such as display 1906 and keyboard 1908 can be interconnected, for example, via bus 1910 as part of a data processing unit 1912. Suitable interconnections via bus 1910, can also be provided to a network interface 1914 (such as a network card), which can be provided to interface with a computer network, and to a media interface 1916 (such as a diskette or compact disc read-only memory (CD-ROM) drive), which can be provided to interface with media 1918.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1902 coupled directly or indirectly to memory elements 1904 through a system bus 1910. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1908, displays 1906, and pointing devices, can be coupled to the system either directly (such as via bus 1910) or through intervening I/O controllers.

Network adapters such as network interface 1914 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1912 as depicted in FIG. 19) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved decompression of seismic data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising:
   obtaining a file chunk of a plurality of file chunks of a larger file, a start offset of the file chunk within the larger file, and a data descriptor indicating how to process the file chunk based on characteristics of the larger file;
   classifying, using at least once processing device in a distributed system, data inside the file chunk as one or more of headers and samples;
   compressing, using the at least once processing device, headers in said file chunk using one or more header compression techniques to obtain one or more compressed headers;
   compressing, using the at least once processing device, samples in said file chunk using one or more sample compression techniques to obtain one or more compressed samples, wherein said one or more header compression techniques are distinct from said one or more sample compression techniques; and
   packing the compressed headers and compressed samples into a single bit stream comprising a compressed version of the file chunk, wherein at least one processing device of one or more of a storage node and a compute node processes the start offset of the file chunk within the larger file and the data descriptor indicating how to process the file chunk based on characteristics of the larger file.

2. The method of claim 1, wherein a restriction is not imposed on a size of the file chunks.

3. The method of claim 1, wherein the data descriptor comprises information for the larger file, a choice and parameters for said data compression algorithm to be applied to the samples of the file chunk, and statistics about the compression of the headers of said larger file.

4. The method of claim 1, wherein a controlling agent divides the larger file into a plurality of said file chunks and determines an association between each of the plurality of file chunks and the corresponding start offsets within the larger file.

5. The method of claim 1, wherein a controlling agent locates and dispatches one or more of said file chunks to be independently compressed to one or more nodes in the distributed system, taking into consideration the said compression descriptor and said start offset of said chunks.

6. The method of claim 1, wherein a controlling agent controls and indexes the file chunks of the larger file that have been compressed and initiates a release of space occupied by the corresponding original data.

7. The method of claim 1, wherein the data descriptor is generated during an initialization phase that processes a statistically significant portion of the larger file to analyze at least a portion of the samples in said larger file; select a sample compression technique to be used on the samples in said larger file; and select one or more parameters for a header compression technique to be used on the headers in said larger file.

8. The method of claim 1, wherein the larger file comprises a seismic file.

9. The method of claim 8, wherein trace headers of said seismic file are compressed using a content-aware substantially lossless compression technique that processes global field-by-field patterns to compress trace fields locally within one or more of said file chunks.

10. The method of claim 9, wherein a file chunk contains one or more trace headers and other data and wherein the method further comprises the steps of obtaining trace indices i related to the start offset of said chunk and, for each header field j of trace i, predicting a field value with a computed function of the obtained trace index i, computing an error in the prediction and storing a residual value and local differences indicating fields of the trace headers for which prediction patterns found locally within the trace header were different from their global counterparts.

11. The method of claim 8, wherein a first chunk of said seismic file comprises textual headers and binary headers, and wherein said step of compressing the one or more headers employs an encoder selected based on a header type.

12. The method of claim 8, wherein values of seismic data samples and headers are compressed using substantially lossless content-aware algorithms.

13. The method of claim 1, wherein the larger file comprises headers of fixed, pre-determined sizes and wherein the start offset and information present in the data descriptor are used to perform the compression.

14. The method of claim 1, wherein said method is implemented in one or more of a physical layer of one or more storage nodes of a file system, a logical layer of one or more storage nodes of a file system and one or more compute nodes within one or more computing clusters.

15. The method of claim 1, wherein said compression method is executed on one or more of on demand by an external agent once data is in storage and in a background mode controlled by a storage operating system and transparent to an external agent.

16. The method of claim 1, wherein said compression method enables users to interact with the version of the file chunk substantially as if they were interacting with an uncompressed version of the file chunk.

17. The method of claim 1, wherein one or more of exponent and length pair statistics for a minimal-length compression method and fraction dictionaries for an alignment compression are created based on information in the data descriptor.

18. The method of claim 1, wherein said compressed version of the file chunk is decompressed using an associated offset of an uncompressed version of the file chunk and the data descriptor.

19. The method of claim 18, wherein an unpacking step classifies data inside the compressed version of the file chunk as one or more of compressed headers and compressed samples using the associated offset and information in the data descriptor and wherein the method further comprises the steps of decompressing compressed headers in said compressed version of the file chunk using one or more header decompression techniques to obtain one or more uncompressed headers and decompressing samples in said compressed version of the file chunk using one or more sample decompression techniques to obtain one or more uncompressed samples.

20. The method of claim 1, wherein a controlling agent interprets access requests to the larger file and manages compressed and uncompressed portions of the larger file in order to answer requests for at least portions of the larger file.

21. The method of claim 1, wherein the file chunk comprises one or more of a file segment, a storage block, and a sequence of stored bytes.

22. A computer program product comprising a non-transitory machine-readable storage medium having encoded therein executable code of one or more software programs, wherein the one or more software programs when executed by at least one processing device in a distributed system perform the following steps:
  obtaining a file chunk of a plurality of file chunks of a larger file, a start offset of the file chunk within the larger file, and a data descriptor indicating how to process the file chunk based on characteristics of the larger file;
  classifying, using the at least once processing device, data inside the file chunk as one or more of headers and samples;
  compressing, using the at least once processing device, headers in said file chunk using one or more header compression techniques to obtain one or more compressed headers;
  compressing, using the at least once processing device, samples in said file chunk using one or more sample compression techniques to obtain one or more compressed samples, wherein said one or more header compression techniques are distinct from said one or more sample compression techniques; and
  packing the compressed headers and compressed samples into a single bit stream comprising a compressed version of the file chunk, wherein at least one processing device of one or more of a storage node and a compute node processes the start offset of the file chunk within the larger file and the data descriptor indicating how to process the file chunk based on characteristics of the larger file.

23. A system, comprising:
  a memory; and
  at least one processing device in a distributed system, coupled to the memory, operative to implement the following steps:
  obtaining a file chunk of a plurality of file chunks of a larger file, a start offset of the file chunk within the larger file, and a data descriptor indicating how to process the file chunk based on characteristics of the larger file;
  classifying, using the at least once processing device, data inside the file chunk as one or more of headers and samples;
  compressing, using the at least once processing device, headers in said file chunk using one or more header compression techniques to obtain one or more compressed headers;
  compressing, using the at least once processing device, samples in said file chunk using one or more sample compression techniques to obtain one or more compressed samples, wherein said one or more header compression techniques are distinct from said one or more sample compression techniques; and
  packing the compressed headers and compressed samples into a single bit stream comprising a compressed version of the file chunk, wherein at least one processing device of one or more of a storage node and a compute node processes the start offset of the file chunk within the larger file and the data descriptor indicating how to process the file chunk based on characteristics of the larger file.

24. The system of claim 23, wherein the data descriptor comprises information for the larger file, a choice and parameters for said data compression algorithm to be applied to the samples of the file chunk, and statistics about the compression of the headers of said larger file.

25. The system of claim 23, wherein the data descriptor is generated during an initialization phase that processes a statistically significant portion of the larger file to analyze at least a portion of the samples in said larger file; select a sample compression technique to be used on the samples in said larger file; and select one or more parameters for a header compression technique to be used on the headers in said larger file.

26. The system of claim 23, wherein said system is implemented in one or more of a physical layer of one or more storage nodes of a file system, a logical layer of one or more storage nodes of a file system and one or more compute nodes within one or more computing clusters.

27. The system of claim 23, wherein said compression method is executed on one or more of on demand by an external agent once data is in storage and in a background mode controlled by a storage operating system and transparent to an external agent.

28. The system of claim 23, wherein one or more of exponent and length pair statistics for a minimal-length compression method and fraction dictionaries for an alignment compression are created based on information in the data descriptor.

29. The system of claim 23, wherein said compressed version of the file chunk is decompressed using an associated offset of an uncompressed version of the file chunk and the data descriptor.

30. The system of claim 29, wherein an unpacking step classifies data inside the compressed version of the file chunk as one or more of compressed headers and compressed samples using the associated offset and information in the data descriptor and wherein the method further comprises the steps of decompressing compressed headers in said compressed version of the file chunk using one or more header decompression techniques to obtain one or more uncompressed headers and decompressing samples in said compressed version of the file chunk using one or more sample decompression techniques to obtain one or more uncompressed samples.

\* \* \* \* \*

UNITED STATES PATENT AND TRADEMARK OFFICE
CERTIFICATE OF CORRECTION

PATENT NO. : 10,169,359 B1
APPLICATION NO. : 14/867329
DATED : January 1, 2019
INVENTOR(S) : Pinho et al.

It is certified that error appears in the above-identified patent and that said Letters Patent is hereby corrected as shown below:

On the Title Page

Item [54], replace "Distribution Content-Aware Compression and Decompression of Data" with
-- Distributed Content-Aware Compression and Decompression of Data --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*